(12) United States Patent
Hankawa et al.

(10) Patent No.: US 6,865,032 B2
(45) Date of Patent: Mar. 8, 2005

(54) REAL IMAGE TYPE FINDER OPTICAL SYSTEM, AND IMAGING SYSTEM COMPRISING THE SAME

(75) Inventors: Masashi Hankawa, Hachioji (JP); Toshio Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 23 days.

(21) Appl. No.: 10/401,545

(22) Filed: Mar. 31, 2003

(65) Prior Publication Data

US 2004/0032672 A1 Feb. 19, 2004

(30) Foreign Application Priority Data

Apr. 5, 2002 (JP) .......................................... 2002-103574
Sep. 10, 2002 (JP) .......................................... 2002-263882

(51) Int. Cl.[7] .......................... G02B 9/00; G02B 15/14; G02B 25/00
(52) U.S. Cl. ........................ 359/754; 359/756; 359/761; 359/643; 359/680
(58) Field of Search ................................. 359/754, 756, 359/761, 643, 432, 422, 380, 379, 680, 676

(56) References Cited

U.S. PATENT DOCUMENTS

| | | | |
|---|---|---|---|
| 5,231,534 A | 7/1993 | Kato | 359/432 |
| 5,323,264 A * | 6/1994 | Kato | 359/432 |
| 5,920,427 A | 7/1999 | Ogata | 359/432 |
| 6,084,720 A | 7/2000 | Kashiki | 359/676 |
| 6,154,314 A | 11/2000 | Takahashi | 359/432 |
| 6,510,010 B1 | 1/2003 | Takahashi | 359/720 |
| 6,584,282 B2 * | 6/2003 | Saito | 396/97 |

FOREIGN PATENT DOCUMENTS

| | | |
|---|---|---|
| JP | 2000-347101 | 12/2000 |
| JP | 2001-133700 | 5/2001 |

* cited by examiner

*Primary Examiner*—Tim Thompson
(74) *Attorney, Agent, or Firm*—Kenyon & Kenyon

(57) ABSTRACT

A real image type finder optical system includes an objective lens group having positive refracting power and an eyepiece lens group having a positive refracting power. The objective lens group includes a first group consisting of a negative lens, a second group consisting of a positive lens, a third group consisting of a positive lens and a fourth group having a negative refracting power and forming part of an image inverting optical system. Upon zooming from a wide-angle end to a telephoto end, the first and fourth groups remain fixed and the second and third groups move. The eyepiece lens group comprises a fifth group that forms part of the image inverting optical system and a sixth group having positive refracting power. The resulting real image type finder optical system satisfies specific conditions with respect to the back focus of the first to third groups at the wide-angle end.

20 Claims, 15 Drawing Sheets

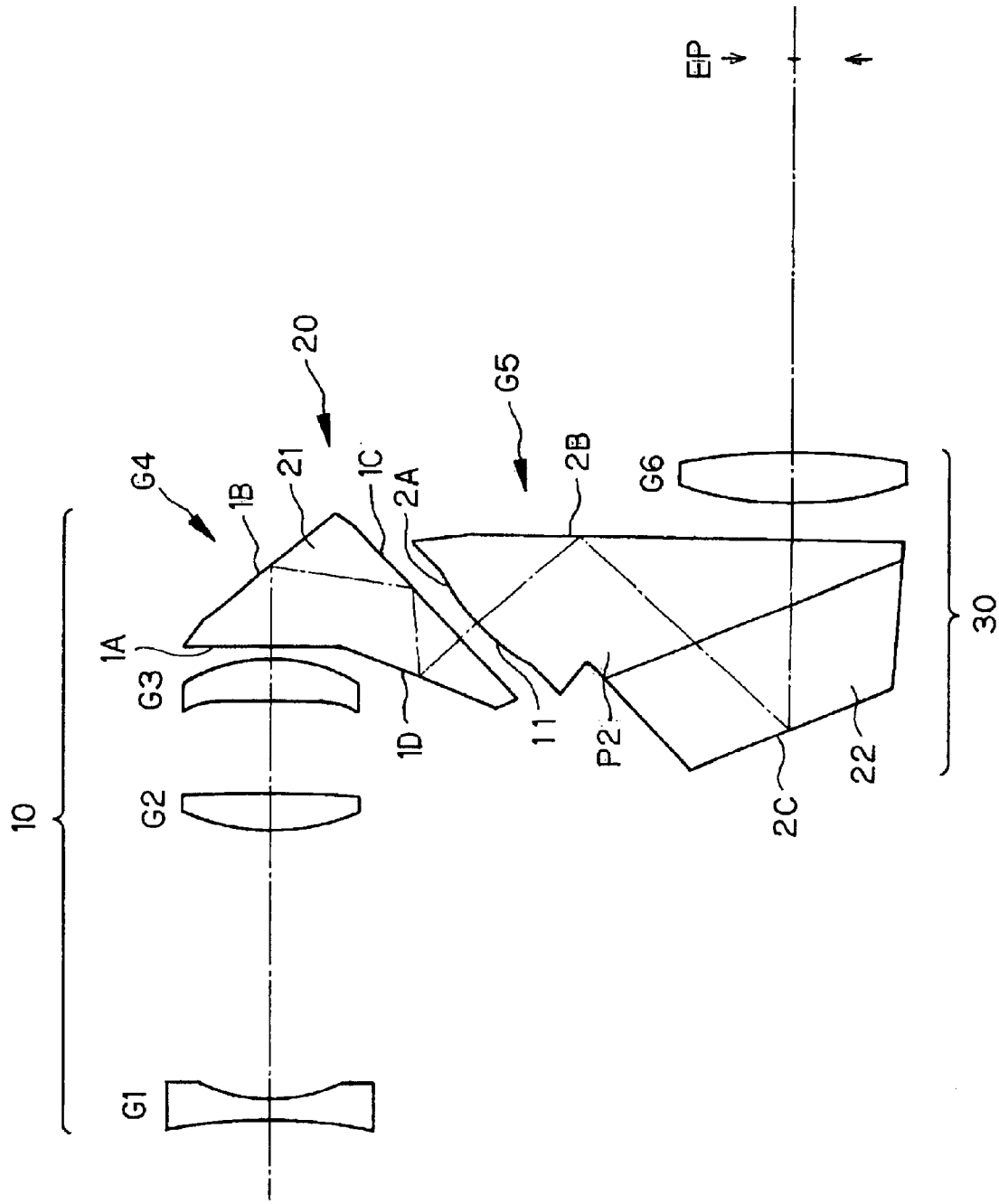

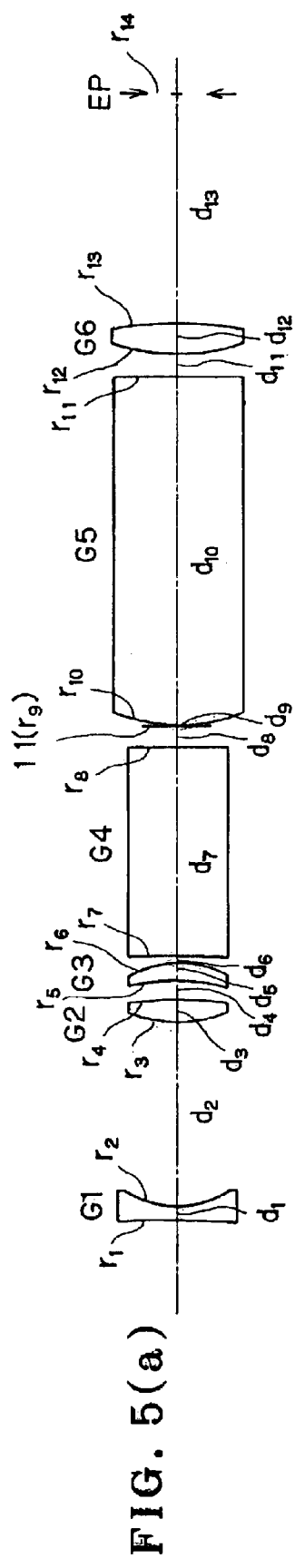
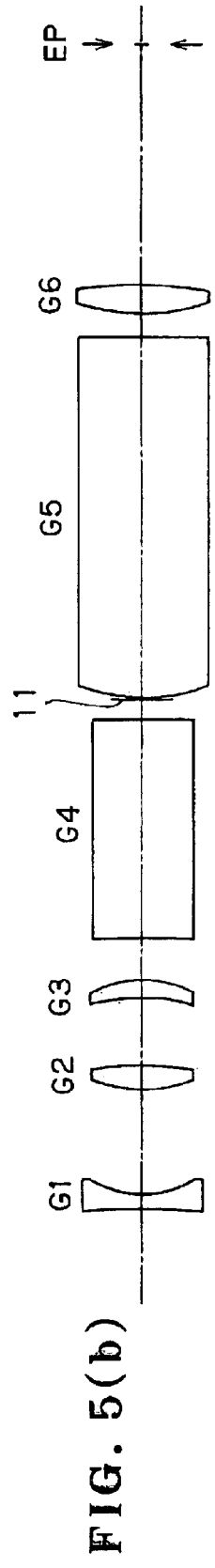
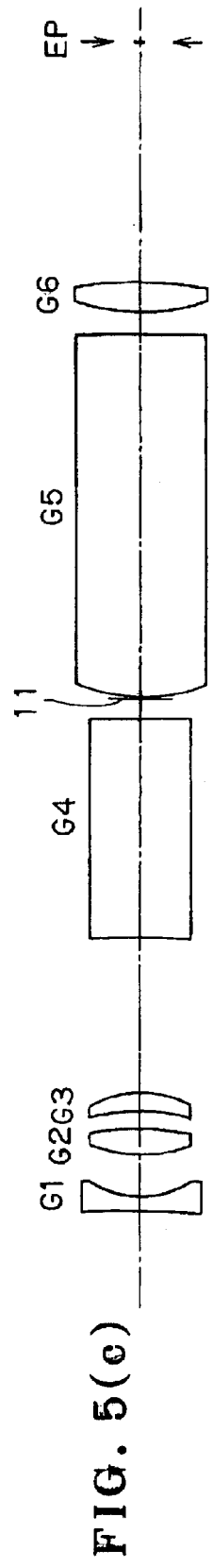
FIG. 5(a)
FIG. 5(b)
FIG. 5(c)

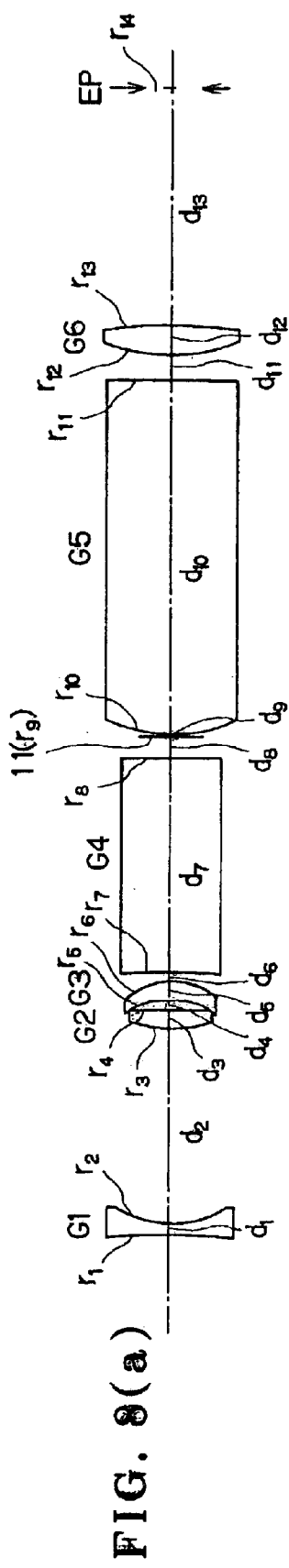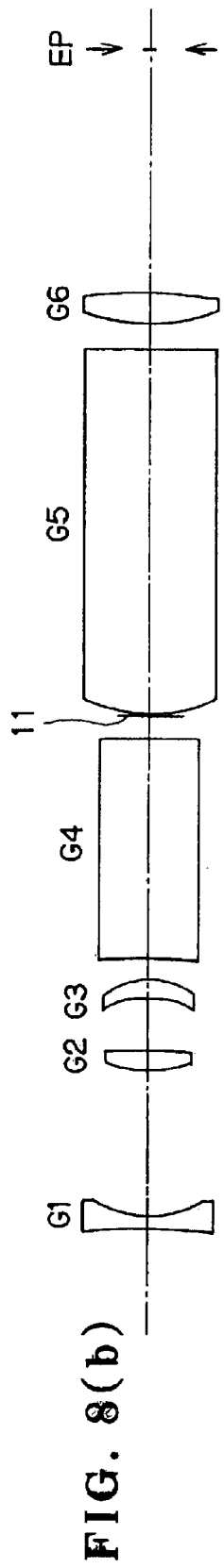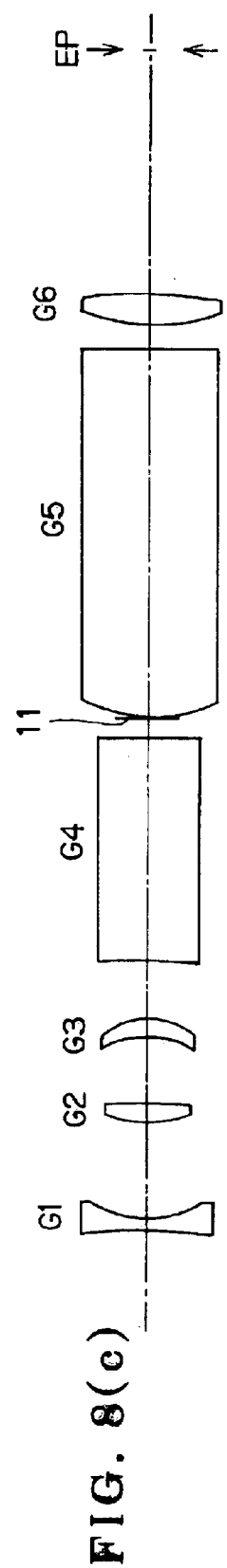
FIG. 8(a)
FIG. 8(b)
FIG. 8(c)

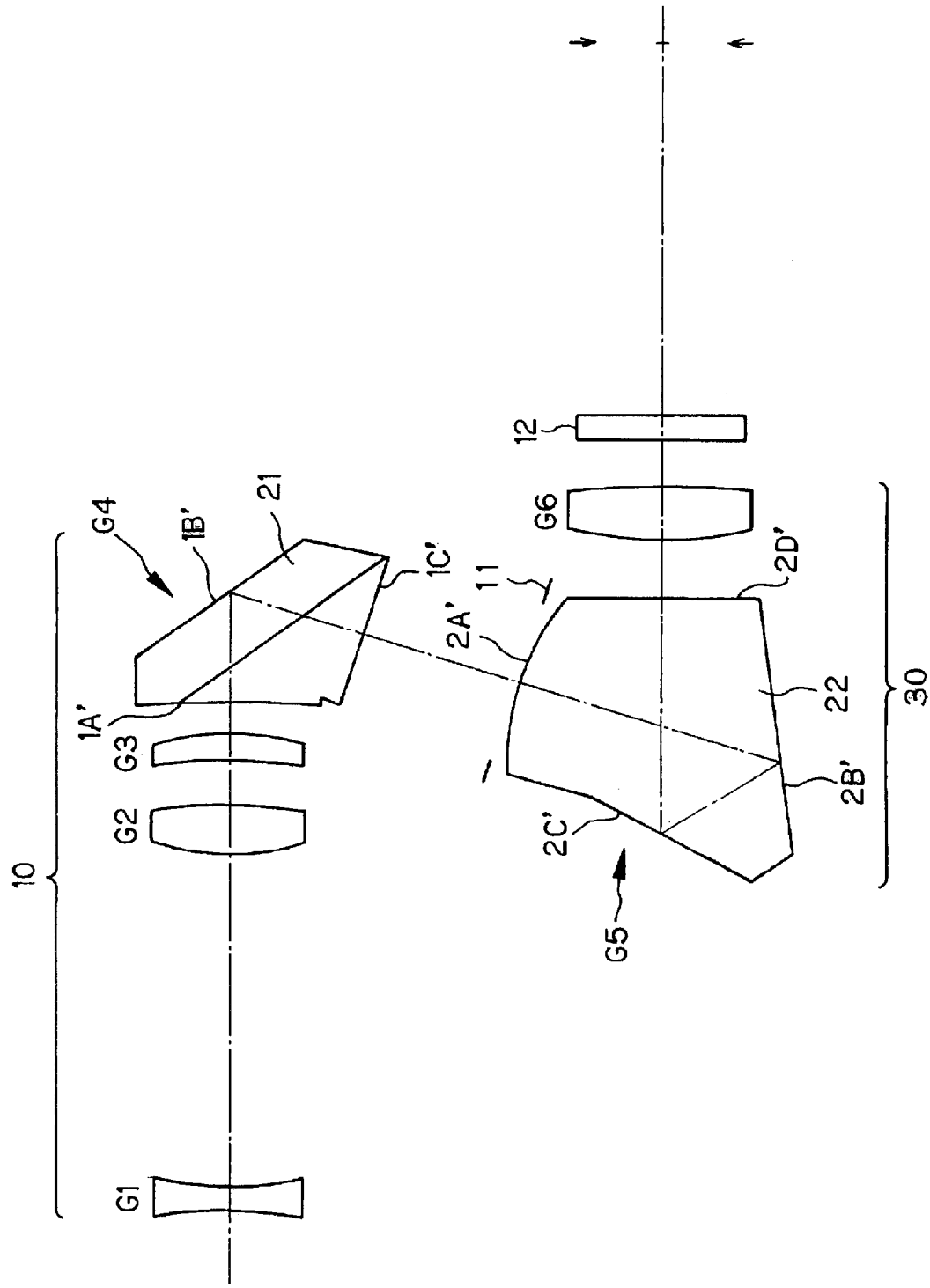

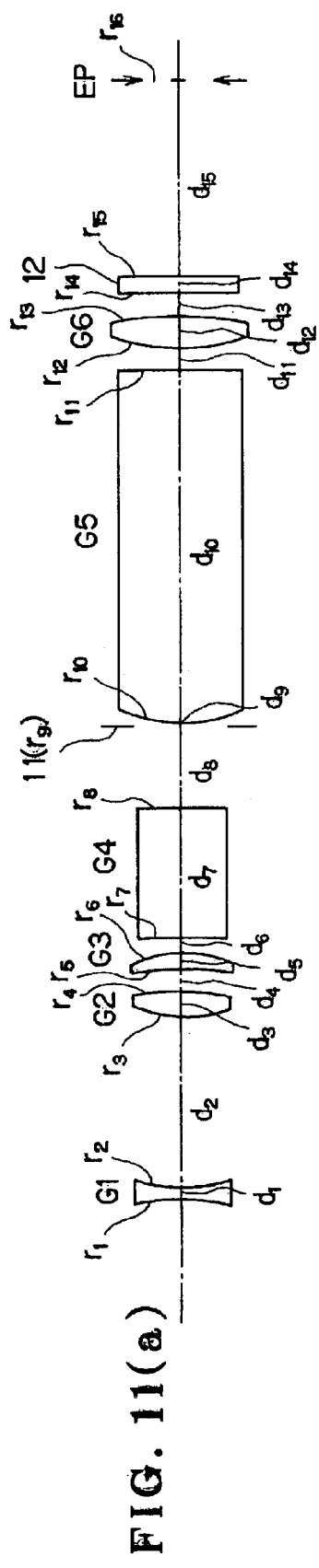
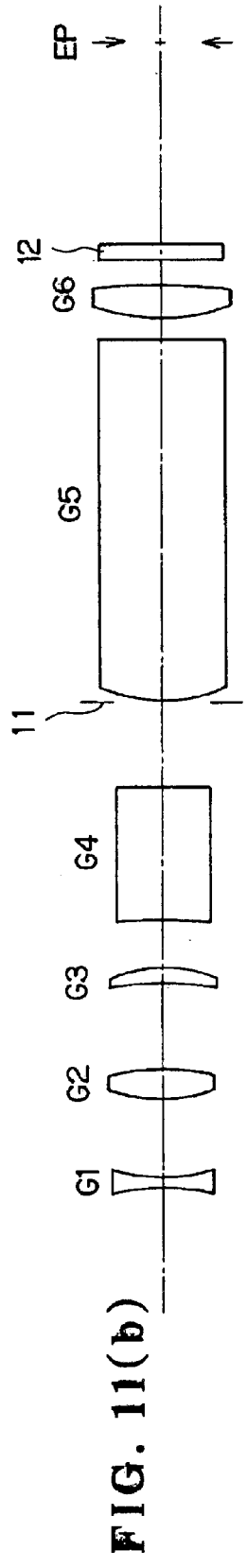
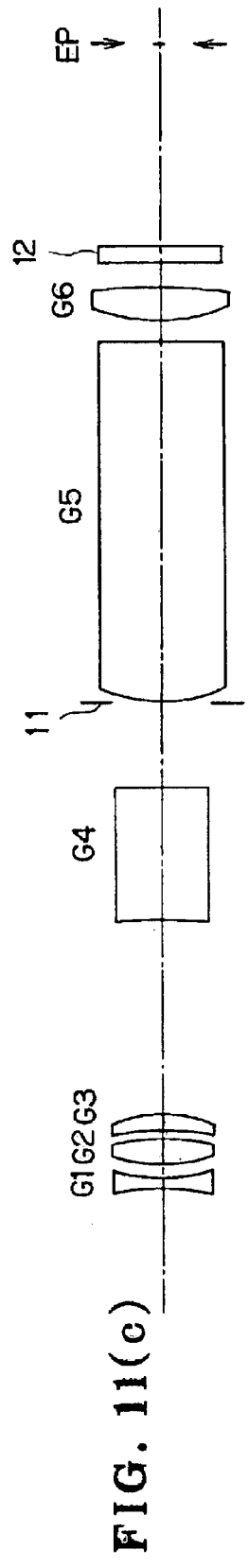
FIG. 11(a)
FIG. 11(b)
FIG. 11(c)

US 6,865,032 B2

REAL IMAGE TYPE FINDER OPTICAL SYSTEM, AND IMAGING SYSTEM COMPRISING THE SAME

This application claims benefits of Japanese Application No. 2002-103574 filed in Japan on Apr. 5, 2002 and No. 2002-263882 filed in Japan on Sep. 10, 2002, the contents of which are incorporated by this reference.

BACKGROUND OF THE INVENTION

The present invention relates generally to a real image type finder optical system and an imaging system comprising the same, and more particularly to a real image type finder optical system that is suitably used with lens shutter cameras, electronic still cameras, etc., in which a taking optical system is provided separately from a finder optical system.

Virtual image type finders and real image type finders are generally known for finders mounted on lens shutter cameras. To try to slim down cameras, however, the real image type finders are still used because the virtual image type finders incur an increase in lens diameters.

As, in recent years, camera makers have increasingly stressed size and cost reductions of cameras, further size and cost reductions have been demanded for finder optical systems mounted on the cameras. So far, zoom types such as two-group, three-group and four-group zoom types, wherein a prism is counted as a sort of lens group, have been proposed as optical systems for objective lenses. For a real image type zoom finder that has a high zoom ratio among these finders, it is desired in view of aberration correction that the associated objective optical system be constructed as a zoom type comprising four or more lens groups. However, the use of two or more lenses in one lens group is not preferred. The reason is that the amount of movement of moving lens groups during zooming is limited. This means that the power of each lens group must be increased, leading to noticeable performance degradation due to decentration errors. etc. during fabrication. To achieve significant size reductions and cost reductions, it is thus preferable to construct each lens group of the objective optical system using one lens (including a prism).

For some zoom types comprising four or more lens groups, it is desired to construct the first lens group using a negative lens, because when the first lens group is made up of a positive lens, the entrance pupil comes near to the primary image-formation plane side, resulting in an increase in the lens diameter. For size reductions, it is also preferable to construct the second, and the third lens group in the form of a positive lens group, because a long enough back focus is ensured with the first to third lens group, leading to an increase in the degree of freedom in prism construction. However, it is not preferable to construct the fourth lens group (prism) using a positive lens, because the lens diameter becomes too large. In other words, the fourth lens group should be made up of a negative lens having a small effective diameter. This also contributes to ensuring the degree of freedom in prism construction.

Such a finder that comprises four objective lens groups, each made up of one lens, and has a −++− construction as viewed in order from its object side, for instance, is set forth in the following patent publications 1 to 6.

Patent Publication 1
  JP-A 5-164964 (Paragraphs 0011 to 0029, and FIGS. 1 to 15)

Patent Publication 2
  JP-A 8-240769(Paragraphs 0022 to 0080, and FIGS. 1 to 13)

Patent Publication 3
  JP-A 11-194271 (Paragraphs 0024 to 0070, and FIGS. 1 to 5)

Patent Publication 4
  JP-A 11-242167 (Paragraphs 0041 to 0218, and FIGS. 1 to 18)

Patent Publication 5
  JP-A 2000-347101 (Paragraphs 0015 to 0046, and FIGS. 1 to 12)

Patent Publication 6
  JP-A 2001-133700 (Paragraphs 0008 to 0024, and FIGS. 1 to 16)

SUMMARY OF THE INVENTION

The first aspect of the present invention provides a real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and the following condition (1) is satisfied:

$$1.60 < f_{b(w)}/f_w < 3.0 \tag{1}$$

where $f_{b(w)}$ is a back focus of a composite system of the first lens group to the third lens group at the wide-angle end, and $f_w$ is a composite focal length of the first lens group to the fourth lens group at the wide-angle end.

The second aspect of the present invention provides a real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and the following condition (2) is satisfied:

$$-2.0 < (D_{1w} - D_{1t})/(f_w - f_t) < -0.7 \tag{2}$$

where $D_{1w}$ is an axial air separation between the first lens group and the second lens group at the wide-angle end, $D_{1t}$ is an axial air separation between the first lens group and the second lens group at the telephoto end, $f_w$ is a composite focal length of the first lens group to the fourth lens group at the wide-angle end, and $f_t$ is a composite focal length of the first lens group to the fourth lens group at the telephoto end.

The third aspect of the present invention provides a real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and the following condition (3) is satisfied:

$$0.89 < (D_{3w} - D_{3t})/(f_w - f_t) < 1.5 \tag{3}$$

where $D_{3w}$ is an axial air separation between the third lens group and the fourth lens group at the wide-angle end, $D_{3t}$ is an axial air separation between the third lens group and the fourth lens group at the telephoto end, $f_w$ is a composite focal length of the first lens group to the fourth lens group at the wide-angle end, and $f_t$ is a composite focal length of the first lens group to the fourth lens group at the telephoto end.

The fourth aspect of the present invention provides a real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and the following condition (4) is satisfied:

$$-3.0 < f_1/f_w < -1.52 \tag{4}$$

where $f_1$ is a focal length of the first lens group, and $f_w$ is a composite focal length of the first lens group to the fourth lens group at the wide-angle end.

The fifth aspect of the present invention provides a real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and the following condition (5) is satisfied:

$$2.1 < D_{1w}/f_w < 4.0 \tag{5}$$

where $D_{1w}$ is an axial air separation between the first lens group and the second lens group at the wide-angle end, and $f_w$ is a composite focal length of the first lens group to the fourth lens group at the wide-angle end.

The sixth aspect of the present invention provides a real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and the following condition (6) is satisfied:

$$6.1 < SD_{w2}/f_w < 10 \tag{6}$$

where $SD_{w2}$ is an axial distance from an object side-surface of the first lens group to an object side-surface of the fifth lens group at the wide-angle end, and $f_w$ is a composite focal length of the first lens group to the fourth lens group at the wide-angle end.

The seventh aspect of the present invention provides a real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and the following condition (7) is satisfied:

$$0.02 < D_{3w}/D_{1w} < 0.10 \quad (7)$$

where $D_{3w}$ is an axial air separation between the third lens group and the fourth lens group at the wide-angle end, and $D_{1w}$ is an axial air separation between the first lens group and the second lens group at the wide-angle end.

The eighth aspect of the present invention provides a real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and the following condition (8) is satisfied:

$$0.06 < D_{1t}/f_t < 0.80 \quad (8)$$

where $D_{1t}$ is an axial air separation between the first lens group and the second lens group at the telephoto end, and $f_t$ is a composite focal length of the first lens group to the fourth lens group at the telephoto end.

The ranges defined by conditions (1) to (8) may be narrowed down as given by:

$$1.85 < f_{b(w)}/f_w < 2.4 \quad (1)'$$

$$-1.6 < (D_{1w}-D_{1t})/(f_w-f_t) < -0.85 \quad (2)'$$

$$0.89 < (D_{3w}-D_{3t})/(f_w-f_t) < 1.0 \quad (3)'$$

$$-1.8 < f_1/f_w < -1.52 \quad (4)'$$

$$2.1 < D_{1w}/f_w < 2.7 \quad (5)'$$

$$6.1 < SD_{w2}/f_w < 8 \quad (6)'$$

$$0.03 < D_{3w}/D_{1w} < 0.05 \quad (7)'$$

$$0.1 < D_{1t}/f_t < 0.2 \quad (8)'$$

It is understood that only the upper limit or only the lower limit may be given to each of conditions (1) to (8).

It is also noted that two or more of conditions (1) to (8) may be applied in any desired combinations.

According to the present invention, an imaging system may be set up using any one of the real image type finder optical systems according to the 1st to 8th aspects of the present invention, and an image-formation optical system that has an entrance optical path different from that of the real image type finder optical system and forms a subject image observed through the real image type finder optical system.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIG. 1 is an optical path diagram for Example 1 of the real image type finder optical system according to the invention.

FIGS. 5(*a*), 5(*b*) and 5(*c*) are exploded optical path representations of Example 4 of the real image type finder optical system according to the invention.

FIGS. 8(*a*), 8(*b*) and 8(*c*) are exploded optical path representations of Example 7 of the real image type finder optical system according to the invention.

FIG. 10 is an optical path diagram for Example 9 of the real image type finder optical system according to the invention.

FIGS. 11(*a*), 11(*b*) and 11(*c*) are exploded optical path representations of Example 9 of the real image type finder optical system according to the invention.

DESCRIPTION OF THE PREFERRED EMBODIMENTS

Figure 2A:
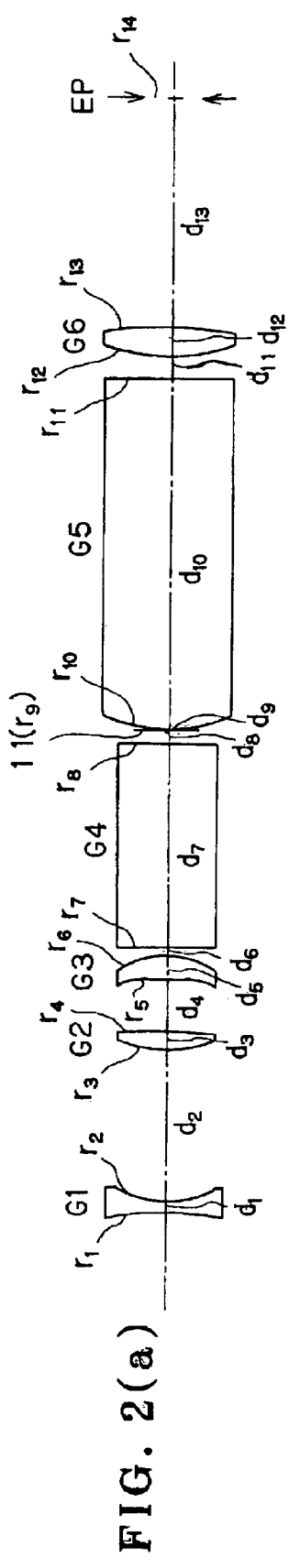
FIGS. 2(*a*), 2(*b*) and 2(*c*) are exploded optical path representations of Example 1 of the real image type finder optical system according to the invention.

The advantages of, and requirements for, the examples corresponding to the real image type finder optical systems according to the 1st to 8th aspects of the invention are now explained.

The advantages of, and requirements for, one specific example of the 1st real image type finder optical system of the invention are first explained.

The objective lens system comprises, in order from its object side, the first lens group consisting of a negative lens, the second lens group consisting of a positive lens and the third lens group consisting of a positive lens, so that the entrance pupil can be positioned near to the object side to decrease the front lens diameter that may otherwise tend to become large at the wide-angle end and ensure a large enough back focus. It is thus possible to increase the degree of freedom in the layout of a prism optical system defined by the fourth lens group. The fourth lens group (prism) is so allowed to have negative refracting power that the effective diameter of the fourth lens group at the entrance side can be decreased. This, too, contributes to the increase in the degree of freedom in the layout of the prism optical system. The high degree of freedom in the layout of the prism optical system leads to an increase in the degree of freedom in the layout of other components, thus making it possible to reduce the thickness and size of an associated camera. Upon zooming, only the second and the third lens group are allowed to move without a change in the length of the objective lens system, so that cam or other structures are prevented from becoming complicated, resulting in significant cost reductions. Falling below the lower limit of 1.60 to condition (1) is not desired, because the degree of freedom in the prism layout becomes low due to a decreased back focus. Exceeding the upper limit of 3.0 makes it difficult to ensure any high enough performance.

The advantages of, and requirements for, one specific example corresponding to the second real image type finder optical system of the invention are now explained.

Condition (2) is provided to standardize the quantity of change in the spacing between the first and the second lens group upon zooming from the wide-angle to the telephoto end in terms of the quantity of change in the composite focal length of the 1st to the 4th lens groups. In the present invention wherein the first lens group remains fixed during zooming, the quantity of change in the spacing between the first and the second lens group during zooming is tantamount to the amount of movement of the second lens group. Falling below the lower limit of −2.0 to condition (2) causes the amount of movement of the second lens group to become large relative to the quantity of change in the focal length, ending up with mechanically structural inconveniences such as deviations of the cam shape for tuning a taking lens to zooming from the range that ensures normal operation. Exceeding the upper limit of −0.7 to condition (2) is not preferable, because the amount of movement of the second lens group becomes too small relative to the quantity of change in the focal length; the power of the second lens group must be increased, for instance, causing decentration performance to degrade considerably.

The advantages of, and requirements for, one specific example corresponding to the 3rd real image type finder optical system of the invention are now explained.

Condition (3) is provided to standardize the quantity of change in the spacing between the third and the fourth lens group upon zooming from the wide-angle to the telephoto end in terms of the quantity of change in the composite focal length of the first to the fourth lens groups. In the present invention wherein the fourth lens group remains fixed during zooming, the quantity of change in the spacing between the third and the fourth lens group during zooming is tantamount to the amount of movement of the third lens group. Falling below the lower limit of 0.89 to condition (3) is not preferable, because the amount of movement of the third lens group becomes too small relative to the quantity of change in the focal length; the power of the third lens group must be increased, for instance, causing decentration performance to degrade considerably. Exceeding the upper limit of 1.5 to condition (3) causes the amount of movement of the third lens group to become large relative to the quantity of change in the focal length, ending up with mechanically structural inconveniences such as deviations of the cam shape for tuning a taking lens to zooming from the range that ensures normal operation.

The advantages of, and requirements for, one specific example corresponding to the 4th real image type finder optical system of the invention are now explained.

Condition (4) is provided to standardize the focal length of the first lens group in terms of the composite focal length of the 1st to the 4th lens group at the wide-angle end. Falling below the lower limit of −3.0 to condition (4) is not preferable because the power of the first lens group becomes weak and so the entrance pupil is positioned nearer to the primary image-formation plane side. To avoid this, the lens diameter must be increased. Exceeding the upper limit of −1.52 to condition (4) is not preferred, because the power of the first lens group becomes strong, resulting in an increase in the sensitivity to diopter of the change in the spacing between the first and the second lens group.

The advantages of, and requirements for, one specific example corresponding to the 5th real image type optical system of the invention are now explained.

Condition (5) is provided to standardize the spacing between the first and the second lens group at the wide-angle end in terms of the composite focal length of the 1st to the 4th lens group at the wide-angle end. Falling below the lower limit of 2.1 to condition (5) is not preferable, because the spacing between the first and the second lens group becomes narrow, causing an increase in the sensitivity to diopter of the change in the spacing between the first and the second lens group. Exceeding the upper limit of 4.0 to condition (5) is not preferable for size reductions, because there is an increase in the spacing between the first and the second lens group.

The advantages of, and requirements for, one specific example corresponding to the 6th real image type optical system of the invention are now explained.

Condition (6) is provided to standardize the axial distance from the object side-surface of the 1st lens group to the object side-surface of the 5th lens group at the wide-angle end in terms of the composite focal length of the 1st to the 4th lens group at the wide-angle end. As the lower limit of 6.1 to condition (6) is not reached, correction of various aberrations, especially spherical aberrations and coma becomes difficult. Exceeding the upper limit of 10 to condition (6) is not preferable for size reductions, because the size of the finder in the thickness direction of a camera becomes large.

The advantages of, and requirements for, one specific example corresponding to the 7th real image type optical system of the invention are now explained.

Condition (7) is representative of the ratio between the axial air separation between the third and the fourth lens group at the wide-angle end and the axial air separation between the first and the second lens group at the wide-angle end. Falling below the lower limit of 0.02 to condition (7) is not preferable for size reductions, because the spacing between the first and the second lens group becomes wide, resulting eventually in an increase in the diameter of the lens in the first lens group. Exceeding the upper limit of 0.10 to condition (7) is not preferable because of a decrease in the amount of movement of the third lens group for zooming. To avoid this the power of the third lens group must be increased, for instance, causing decentration performance to degrade considerably.

The advantages of, and requirements for, one specific example corresponding to the 8th real image type optical system of the invention are now explained.

Condition (8) is provided to standardize the spacing between the first and the second lens group at the telephoto end in terms of the composite focal length of the 1st to the 4th lens group at the telephoto end. Falling below the lower limit of 0.06 to condition (8) is not preferable because there is an increase in the sensitivity to diopter of the change in the separation between the first and the second lens group. Exceeding the upper limit of 0.80 to condition (8) is not preferable, because the power of the second lens group must be increased to satisfy the amount of movement of the second lens group for zooming, for instance, causing decentration performance to degrade considerably.

For each of the 1st to the 8th real image type finder optical systems, it is desired that the fourth lens group should have a plurality of reflecting surfaces at which three reflections take place, and the fifth lens group should have a roof reflecting surface.

With such an arrangement, the long back focus of the objective lens group can be used to locate the position of an intermediate image within an image-erecting optical system, so that the size of the finder can be reduced in its thickness direction. The use of the roof reflecting surface prevents the image-erecting optical system from becoming thick, so that an additional compactness is achievable.

For each of the 1st to the 8th real image type finder optical systems, it is desired that a field stop for limiting a viewing field be located in the vicinity of the focal plane defined by the objective lens group, and the maximum half angle of view of incidence, $\omega_w$, at the wide-angle end satisfy condition (9):

$$27° < \omega_w < 45° \quad (9)$$

As the lower limit of 27° to condition (9) is not reached, the angle of view at the wide-angle end is far away from that needed commonly for compact cameras. As the upper limit of 45° is exceeded, on the other hand, it is difficult to correct for distortion at the wide-angle end with a reduced number of lenses.

More preferably, the lower limit to condition (9) should be set at 30°, because optical performance can be well reconciled with the viewing angle. Likewise, the upper limit should be set at 40°, because correction of distortion at the wide-angle end is more advantageously made.

For each of the 1st to the 8th real image type finder optical systems, it is desired that a field stop for limiting a viewing field be located in the vicinity of the focal plane defined by the objective lens group, and the maximum half angle of view of incidence, $\omega_t$, at the telephoto end satisfy condition (10):

$$5° < \omega_t < 18° \quad (10)$$

As the lower limit of 5° to condition (10) is not reached, the amount of movement of the moving lens groups becomes large, taking up much space. As the upper limit of 18° is exceeded, on the other hand, the zooming range becomes narrow.

More preferably, the lower limit to condition (10) should be set at 8°, because a sensible tradeoff can easily be made between the zoom ratio and compactness. Likewise, the upper limit should be set at 12°, because distortion at the wide-angle end is more favorably corrected.

For each of the 1st to the 8th real image type finder optical systems, it is further desired to satisfy condition (11):

$$1.7 < f_t/f_w < 6 \quad (11)$$

Here $f_t$ is a composite focal length of the 1st to the 4th lens group at the telephoto end, and $f_w$ is a composite focal length of the 1st to the 4th lens group at the wide-angle end.

As the lower limit of 1.7 to condition (11) is not reached, the zooming range becomes narrow. As the upper limit of 6 is exceeded, the amount of movement of the moving lens groups becomes large, taking up much space, although the zooming range becomes wide.

More preferably, the lower limit or the upper limit to condition (11) should be set at 2.0 or 4.0, because compactness is more easily balanced against gaining the zoom ratio and correction of aberrations.

Examples 1 to 8 of the real image type finder optical system of the invention are now given.

Generally, Examples 1 to 8 are each composed of an objective lens group 10 having positive refracting power and an eyepiece lens group 30 having positive refracting power, as typically shown in FIG. 1 that is an optical path diagram for Example 1. The objective lens group 10 is composed of a first lens group G1 consisting of a single negative lens, a second lens group G2 consisting of a single positive lens, a third lens group G3 consisting of a single positive lens, and a fourth lens group G4 consisting of a first prism 21 that forms a part of an image inverting optical system 20 and having negative reflecting power. The eyepiece lens group 30 is composed of a fifth lens group G5 consisting of a second prism 22 that forms another part of the image inverting optical system 20, and a sixth lens group G6 consisting of a single positive lens.

Throughout Examples 1 to 8, an intermediate image is formed by the objective lens group 10 in the vicinity of the position of an entrance surface 2A of the second prism 22, and a field frame 11 is located in the vicinity of that entrance surface 2A.

The first prism 21 is constructed such that after passing successively through the first lens group G1, the second lens group G2 and the third lens group G3 in the objective lens group 10, a light axis is entered in the first prism 21 from its entrance surface 1A in such a way as not to cross over itself in the first prism 21, and then reflected at its optical surfaces 1B, 1C and 1D in this order, finally leaving the optical surface 1C that is a combined reflecting and transmitting surface. The second prism 22 is constructed such that the light axis leaving the first prism 21 is entered in the second prism 22 from its entrance surface 2A in such a way as not to cross over itself in the second prism 22, and then reflected at its optical surfaces 2B and 2C in this order, finally leaving the optical surface 2B that is a combined reflecting and transmitting surface. The optical surfaces 1B and 1D are applied with mirror coatings, with the optical surface 2C defined by a roof reflecting portion, and the refracting surfaces and reflecting surfaces are all defined by surfaces of rotationally symmetric curvature including a plane.

The angles of the optical surfaces 1A to 1D of the first prism 21 and the angles of the optical surfaces 2A to 2C of the second prism 22 are determined such that the light axis entering the optical surface 1A is parallel with the light axis emerging from the optical surface 2B.

For zooming by the objective lens group 10 from the wide-angle to the telephoto end, the second lens group G2 and the third lens group G3 are moved while the first lens group G1 and the fourth lens group G4 remain fixed.

In FIG. 1, EP is indicative of the exit pupil (eye point).

Examples 1 to 8 are now explained more specifically with reference to FIGS. 2 to 9 that are exploded optical path diagrams for Examples 1 to 8. In FIGS. 2 to 9, (a), (b), and (c) is an exploded optical path diagram at the wide-angle end, in an intermediate state, and at the telephoto end, respectively.

Figure 2B:
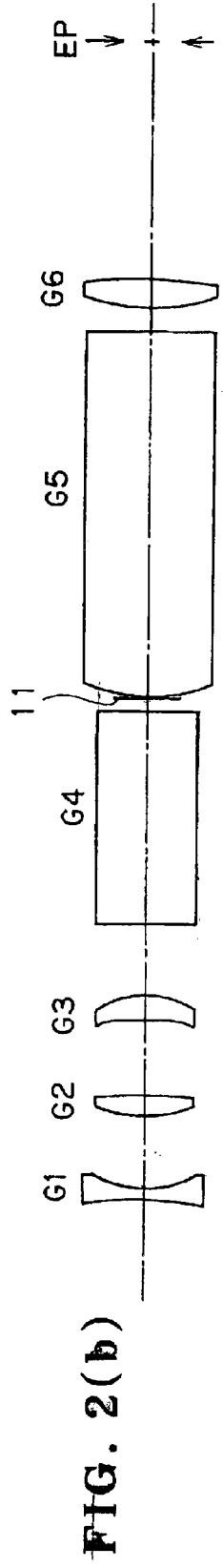
Figure 2C:
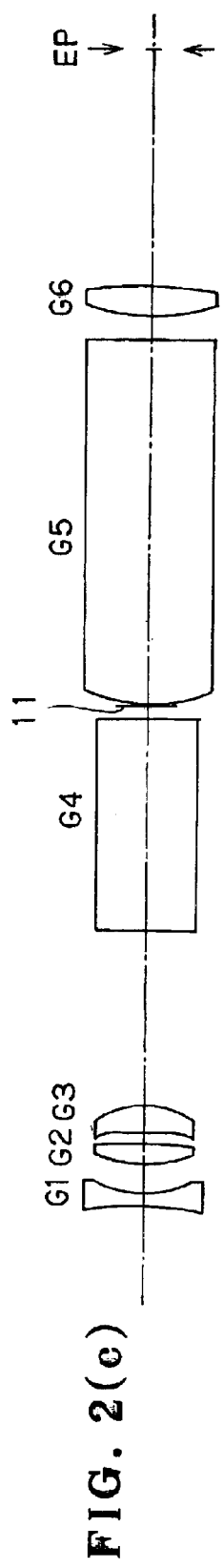

As shown in FIGS. 2(a), 2(b) and 2(c), the objective lens group 10 in the real image type finder optical system of Example 1 is made up of a first lens group G1 consisting of a double-concave negative single lens, a second lens group G2 consisting of a double-convex positive single lens, a third lens group G3 consisting of a double-convex positive single lens and a fourth lens group G4 consisting of a first prism 21 that is equivalent in construction to a planoconcave negative single lens. The eyepiece lens group 30 is made up of a fifth lens group G5 consisting of a second prism 22 that is equivalent in construction to a planoconvex positive single lens and a sixth lens group G6 consisting of a double-convex positive single lens. A field frame 11 is located at the position of the entrance side-surface of the fifth lens group G5.

Six aspheric surfaces are located; one at the entrance side-surface of the first lens group G1, one at the entrance side-surface of the second lens group G2, two at both surfaces of the third lens group G3, one at the entrance side-surface of the fourth lens group G4, and one at the entrance side-surface of the sixth lens group G6.

Upon zooming from the wide-angle to the telephoto end, the first lens group G1 remains fixed, the second lens group G2 moves monotonously toward the object side, and the third lens group G3 moves toward the object side while the spacing between the second lens group G2 and the third lens group G3 becomes first wide and then narrow. The spacing between the second lens group G2 and the third lens group G3 is narrower at the telephoto end than at the wide-angle end.

Figure 3A:
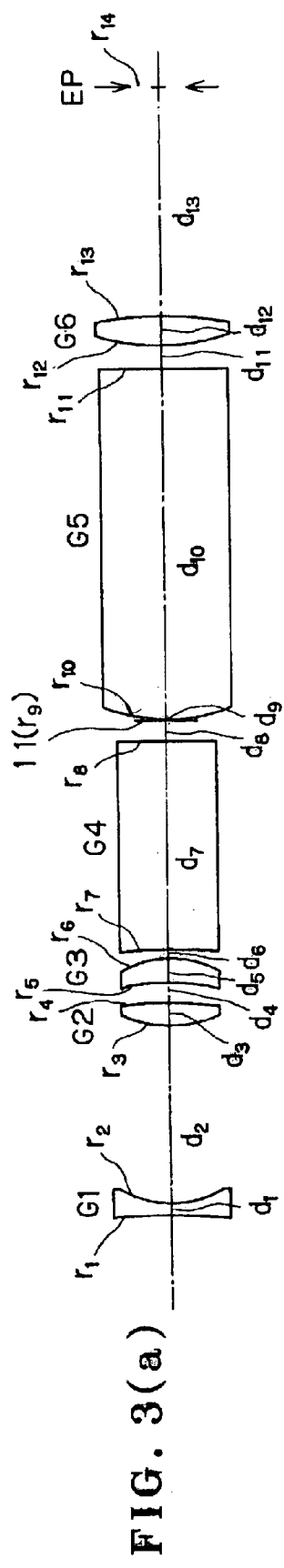
FIGS. 3(*a*), 3(*b*) and 3(*c*) are exploded optical path representations of Example 2 of the real image type finder optical system according to the invention.
Figure 3B:
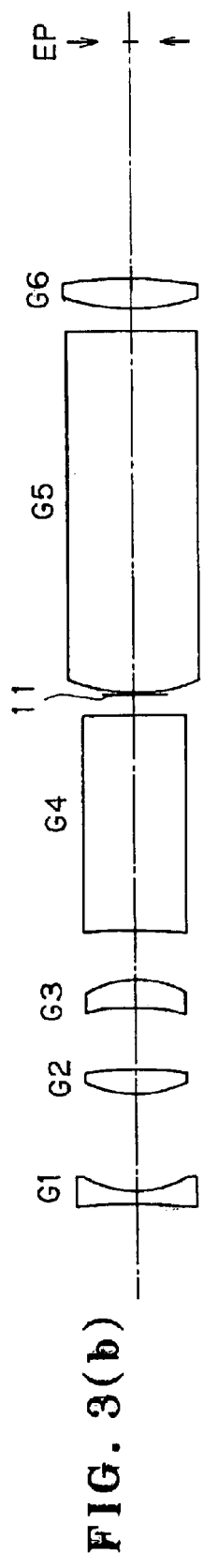
Figure 3C:
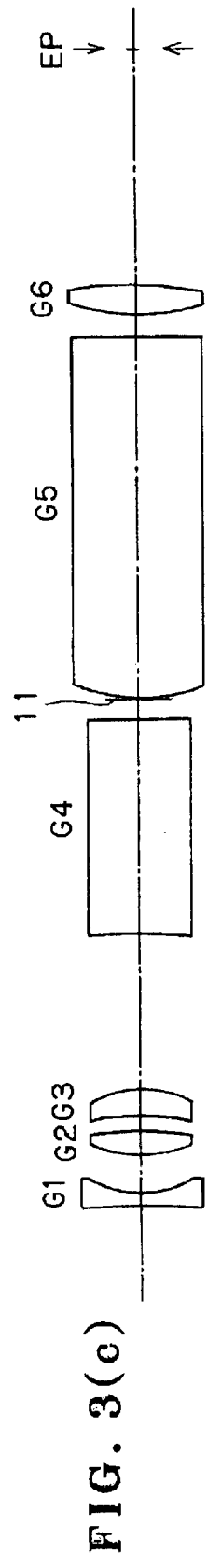

As shown in FIGS. 3(a), 3(b) and 3(c), the objective lens group 10 in the real image type finder optical system of Example 2 is made up of a first lens group G1 consisting of a double-concave negative single lens, a second lens group G2 consisting of a double-convex positive single lens, a third lens group G3 consisting of a positive meniscus single lens concave on its object side and a fourth lens group G4 consisting of a first prism 21 that is equivalent in construction to a planoconcave negative single lens. The eyepiece lens group 30 is made up of a fifth lens group G5 consisting of a second prism 22 that is equivalent in construction to a planoconvex positive single lens and a sixth lens group G6 consisting of a double-convex positive single lens. A field frame 11 is located at the position of the entrance side-surface of the fifth lens group G5.

Six aspheric surfaces are located; one at the entrance side-surface of the first lens group G1, one at the entrance side-surface of the second lens group G2, two at both surfaces of the third lens group G3, one at the entrance side-surface of the fourth lens group G4, and one at the entrance side-surface of the sixth lens group G6.

Upon zooming from the wide-angle to the telephoto end, the first lens group G1 remains fixed, the second lens group G2 moves monotonously toward the object side, and the third lens group G3 moves toward the object side while the spacing between the second lens group G2 and the third lens group G3 becomes first wide and then narrow. The spacing between the second lens group G2 and the third lens group G3 is narrower at the telephoto end than at the wide-angle end.

Figure 4A:
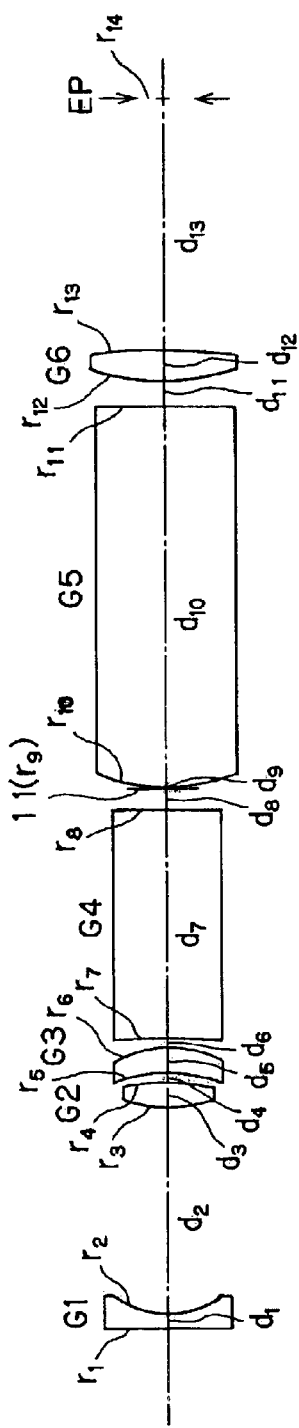
FIGS. 4(*a*), 4(*b*) and 4(*c*) are exploded optical path representations of Example 3 of the real image type finder optical system according to the invention.
Figure 4B:
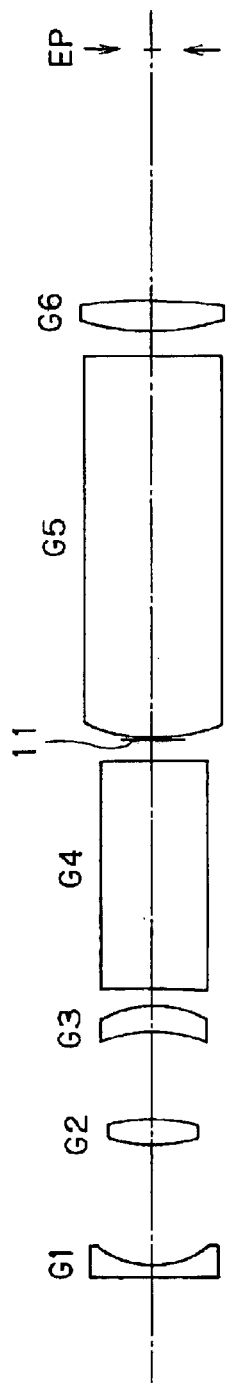
Figure 4C:
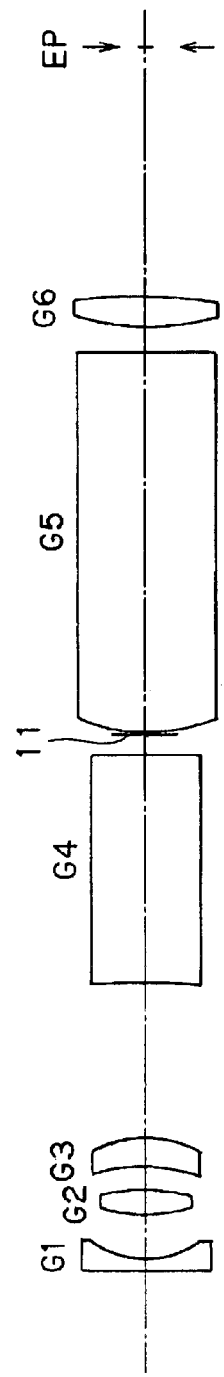

As shown in FIGS. 4(a), 4(b) and 4(c), the objective lens group 10 in the real image type finder optical system of Example 3 is made up of a first lens group G1 consisting of a double-concave negative single lens, a second tens group G2 consisting of a double-convex positive single lens, a third lens group G3 consisting of a positive meniscus single lens concave on its object side and a fourth lens group G4 consisting of a first prism 21 that is equivalent in construction to a planoconcave negative single lens. The eyepiece lens group 30 is made up of a fifth lens group G5 consisting of a second prism 22 that is equivalent in construction to a planoconvex positive single lens and a sixth lens group G6 consisting of a double-convex positive single lens. A field frame 11 is located at the position of the entrance side-surface of the fifth lens group G5.

Six aspheric surfaces are located; one at the entrance side-surface of the first lens group G1, one at the entrance side-surface of the second lens group G2, two at both surfaces of the third lens group G3, one at the entrance side-surface of the fourth lens group G4, and one at the entrance side-surface of the sixth lens group G6.

Upon zooming from the wide-angle to the telephoto end, the first lens group G1 remains fixed, the second lens group G2 moves monotonously toward the object side, and the third lens group G3 moves toward the object side while the spacing between the second lens group G2 and the third lens group G3 becomes fist wide and then narrow. The spacing between the second lens group G2 and the third lens group G3 is wider at the telephoto end than at the wide-angle end.

As shown in FIGS. 5(a), 5(b) and 5(c), the objective lens group 10 in the real image type finder optical system of Example 4 is made up of a first lens group G1 consisting of a double-concave negative single lens, a second lens group G2 consisting of a double-convex positive single lens, a third lens group G3 consisting of a positive meniscus single lens concave on its object side and a fourth lens group G4 consisting of a first prism 21 that is equivalent in construction to a planoconcave negative single lens. The eyepiece lens group 30 is made up of a fifth lens group G5 consisting of a second prism 22 that is equivalent in construction to a planoconvex positive single lens and a sixth lens group G6 consisting of a double-convex positive single lens. A field frame 11 is located at the position of the entrance side-surface of the fifth lens group G5.

Six aspheric surfaces are located; one at the entrance side-surface of the first lens group G1, one at the entrance side-surface of the second lens group G2, two at both surfaces of the third lens group G3, one at the entrance side-surface of the fourth lens group G4, and one at the entrance side-surface of the sixth lens group G6.

Upon zooming from the wide-angle to the telephoto end, the first lens group G1 remains fixed, the second lens group G2 moves monotonously toward the object side, and the third lens group G3 moves toward the object side while the spacing between the second lens group G2 and the third lens group G3 becomes first wide and then narrow. The spacing between the second lens group G2 and the third lens group G3 is narrower at the telephoto end than at the wide-angle end.

Figure 6A:
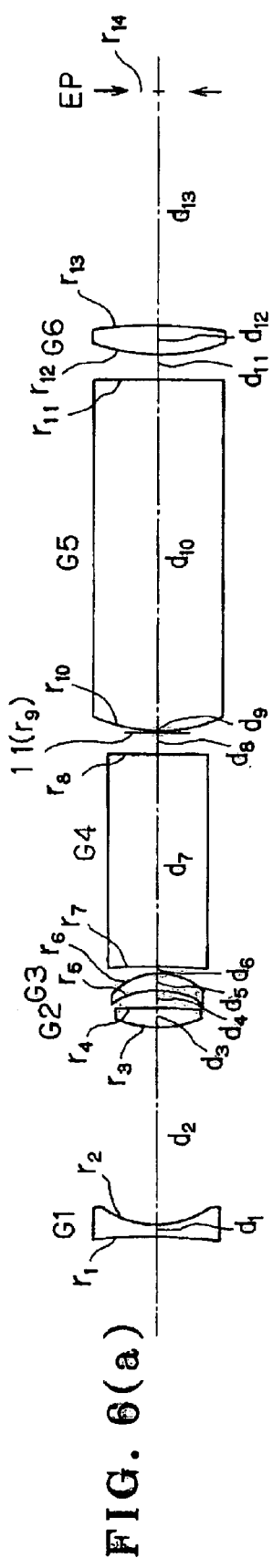
FIGS. 6(*a*), 6(*b*) and 6(*c*) are exploded optical path representations of Example 5 of the real image type finder optical system according to the invention.
Figure 6B:
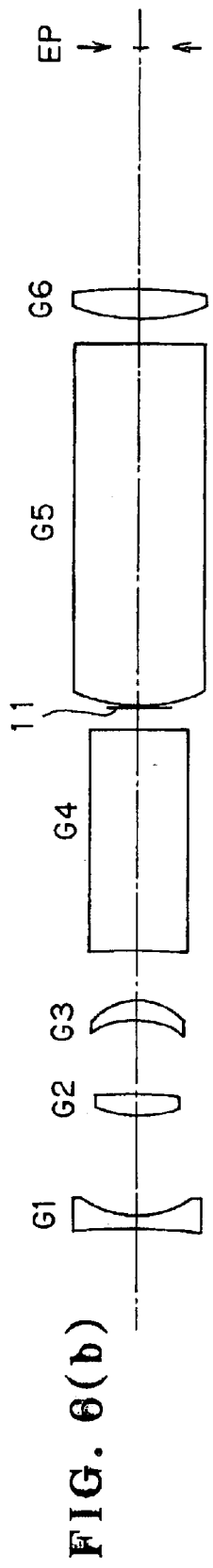
Figure 6C:
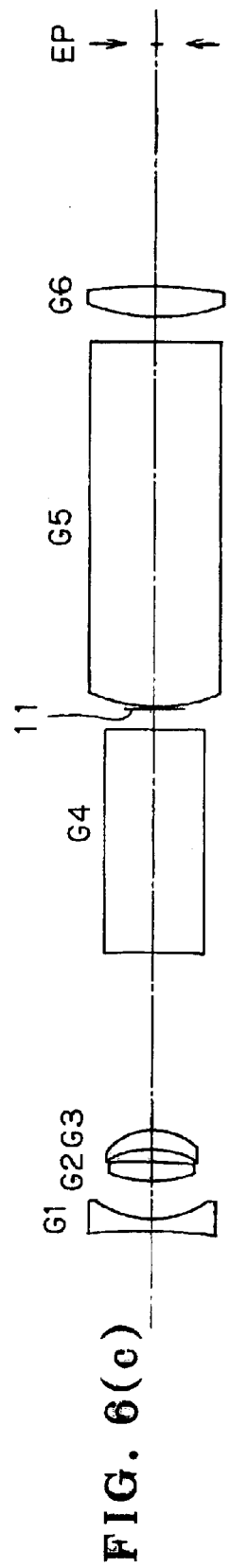

As shown in FIGS. 6(a), 6(b) and 6(c), the objective lens group 10 in the real image type finder optical system of Example 5 is made up of a first lens group G1 consisting of a double-concave negative single lens, a second lens group G2 consisting of a double-convex positive single lens, a third lens group G3 consisting of a positive meniscus single lens concave on its object side and a fourth lens group G4 consisting of a first prism 21 that is equivalent in construction to a planoconcave negative single lens. The eyepiece lens group 30 is made up of a fifth lens group G5 consisting of a second prism 22 that is equivalent in construction to a planoconvex positive single lens and a sixth lens group G6 consisting of a double-convex positive single lens. A field frame 11 is located at the position of the entrance side-surface of the fifth lens group G5.

Six aspheric surfaces are located; one at the entrance side-surface of the first lens group G1, one at the entrance side-surface of the second lens group G2, two at both surfaces of the third lens group G3, one at the entrance side-surface of the fourth lens group G4, and one at the entrance side-surface of the sixth lens group G6.

Upon zooming from the wide-angle to the telephoto end, the first lens group G1 remains fixed, the second lens group G2 moves monotonously toward the object side, and the third lens group G3 moves toward the object side while the spacing between the second lens group G2 and the third lens group G3 becomes first wide and then narrow. The spacing between the second lens group G2 and the third lens group G3 is narrower at the telephoto end than at the wide-angle end.

Figure 7A:
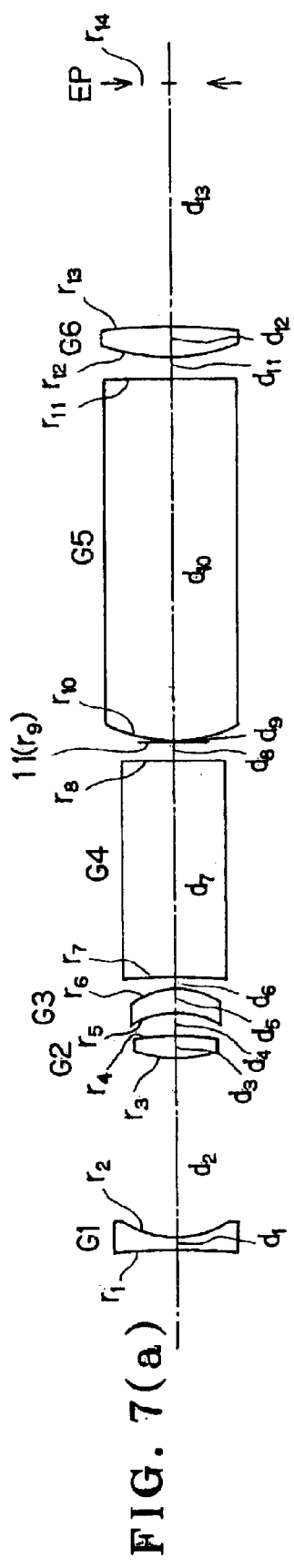
FIGS. 7(*a*), 7(*b*) and 7(*c*) are exploded optical path representations of Example 6 of the real image type finder optical system according to the invention.
Figure 7B:
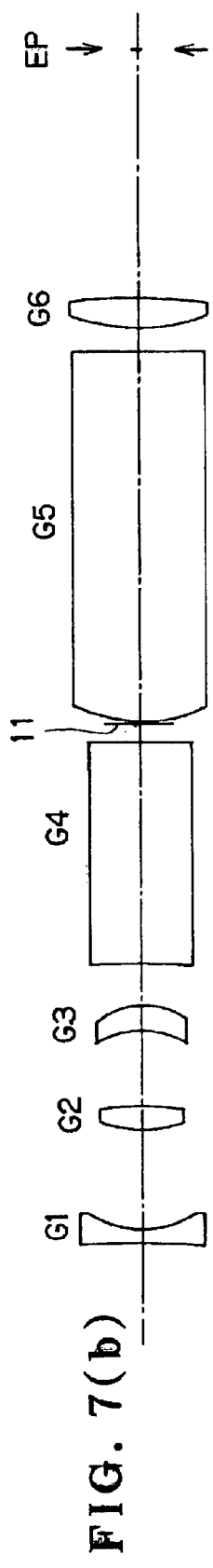
Figure 7C:
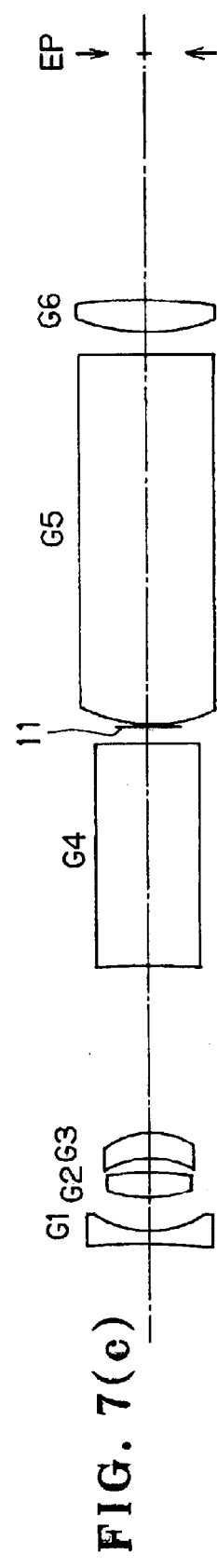

As shown in FIGS. 7(a), 7(b) and 7(c), the objective lens group 10 in the real image type finder optical system of Example 6 is made up of a first lens group G1 consisting of a double-concave negative single lens, a second lens group G2 consisting of a double-convex positive single lens, a third lens group G3 consisting of a positive meniscus single lens concave on its object side and a fourth lens group G4 consisting of a first prism 21 that is equivalent in construction to a planoconcave negative single lens. The eyepiece lens group 30 is made up of a fifth lens group G5 consisting of a second prism 22 that is equivalent in construction to a planoconvex positive single lens and a sixth lens group G6 consisting of a double-convex positive single lens. A field frame 11 is located at the position of the entrance side-surface of the fifth lens group G5.

Six aspheric surfaces are located; one at the entrance side-surface of the first lens group G1, one at the entrance side-surface of the second lens group G2, two at both surfaces of the third lens group G3, one at the entrance side-surface of the fourth lens group G4, and one at the entrance side-surface of the sixth lens group G6.

Upon zooming from the wide-angle to the telephoto end, the first lens group G1 remains fixed, the second lens group G2 moves monotonously toward the object side, and the third lens group G3 moves toward the object side while the spacing between the second lens group G2 and the third lens group G3 becomes first wide and then narrow. The spacing between the second lens group G2 and the third lens group G3 is narrower at the telephoto end than at the wide-angle end.

As shown in FIGS. 8(a), 8(b) and 8(c), the objective lens group 10 in the real image type finder optical system of Example 7 is made up of a first lens group G1 consisting of a double-concave negative single lens, a second lens group G2 consisting of a double-convex positive single lens, a third lens group G3 consisting of a positive meniscus single lens concave on its object side and a fourth lens group G4 consisting of a first prism 21 that is equivalent in construction to a planoconcave negative single lens. The eyepiece lens group 30 is made up of a fifth lens group G5 consisting of a second prism 22 that is equivalent in construction to a planoconvex positive single lens and a sixth lens group G6 consisting of a double-convex positive single lens. A field frame 11 is located at the position of the entrance side-surface of the fifth lens group G5.

Six aspheric surfaces are located; one at the entrance side-surface of the first lens group G1, one at the entrance side-surface of the second lens group G2, two at both surfaces of the third lens group G3, one at the entrance side-surface of the fourth lens group G4, and one at the entrance side-surface of the sixth lens group G6.

Upon zooming from the wide-angle to the telephoto end, the first lens group G1 remains fixed, the second lens group G2 moves monotonously toward the object side, and the third lens group G3 moves toward the object side while the spacing between the second lens group G2 and the third lens group G3 becomes wide. The spacing between the second lens group G2 and the third lens group G3 is wider at the telephoto end than at the wide-angle end.

Figure 9A:
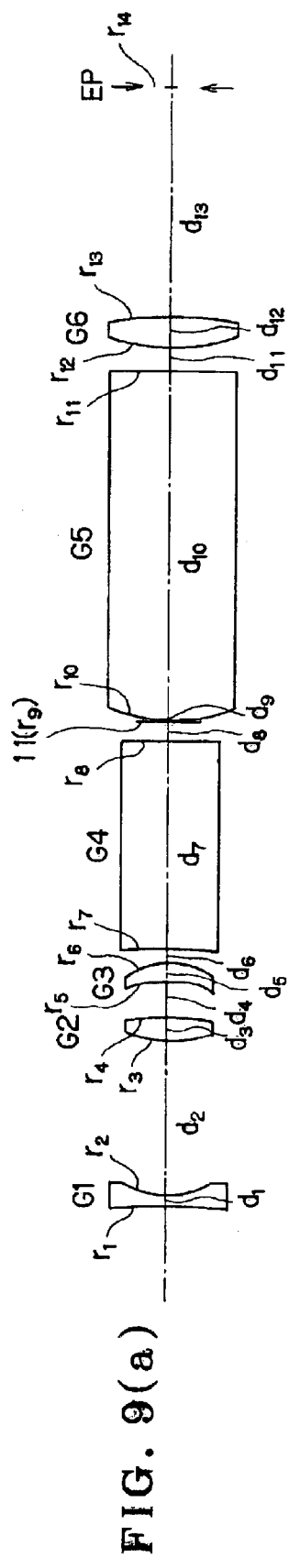
FIGS. 9(*a*), 9(*b*) and 9(*c*) are exploded optical path representations of Example 8 of the real image type finder optical system according to the invention.
Figure 9B:
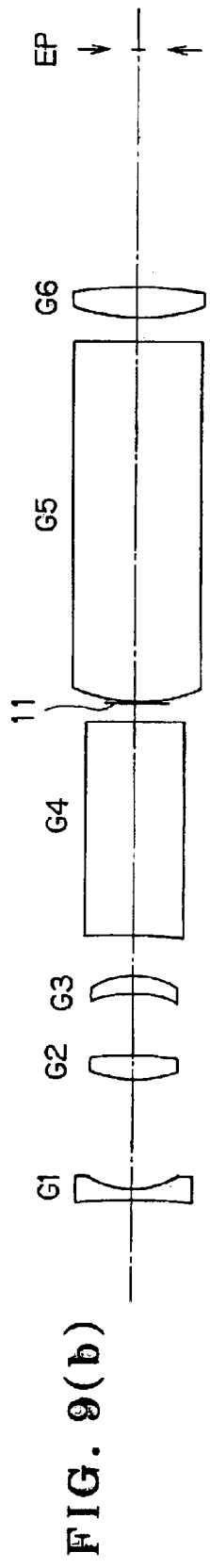
Figure 9C:
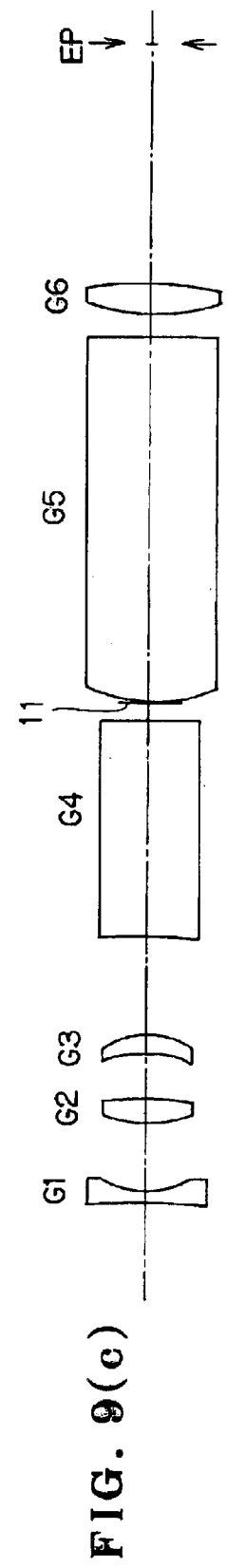

As shown in FIGS. 9(a), 9(b) and 9(c), the objective lens group 10 in the real image type finder optical system of Example 8 is made up of a first lens group G1 consisting of a double-concave negative single lens, a second lens group G2 consisting of a double-convex positive single lens, a third lens group G3 consisting of a positive meniscus single lens concave on its object side and a fourth lens group G4 consisting of a first prism 21 that is equivalent in construction to a planoconcave negative single lens. The eyepiece lens group 30 is made up of a fifth lens group G5 consisting of a second prism 22 that is equivalent in construction to a planoconvex positive single lens and a sixth lens group G6 consisting of a double-convex positive single lens. A field frame 11 is located at the position of the entrance side-surface of the fifth lens group G5.

Six aspheric surfaces are located; one at the entrance side-surface of the first lens group G1, one at the entrance side-surface of the second lens group G2, two at both surfaces of the third lens group G3, one at the entrance side-surface of the fourth lens group G4, and one at the entrance side-surface of the sixth lens group G6.

Upon zooming from the wide-angle to the telephoto end, the first lens group G1 remains fixed, the second lens group G2 moves monotonously toward the object side, and the third lens group G3 moves toward the object side while the spacing between the second lens group G2 and the third lens group G3 becomes first wide and then narrow. The spacing between the second lens group G2 and the third lens group G3 is wider at the telephoto end than at the wide-angle end.

Next, an optical path diagram for the real image type finder optical system at the wide-angle end of Example 9 of the invention is shown in FIG. 10. FIGS. 11(a), 11(b) and 11(c) are exploded optical path diagrams for Example 9 at the wide-angle end, in an intermediate state and at the telephoto end, respectively.

As shown in FIG. 10, the real image type finder optical system of Example 9 is composed of an objective lens group 10 having positive refracting power and an eyepiece lens group 30 having positive refracting power. The objective lens group is composed of a first lens group G1 consisting of a single negative lens, a second lens group G2 consisting of a single positive lens, a third lens group G3 consisting of a single positive lens, and a fourth lens group G4 consisting of a first prism 21 that is a roof prism forming a part of an image-inversing optical system 20 and having negative reflecting power. The eyepiece lens group 30 is composed of a fifth lens group G5 having positive refracting power and consisting of a second prism 22 that is a penta prism forming another part of the image-inverting optical system 20, and a sixth lens group G6 consisting of a single positive lens. A cover glass 12 is located on the viewing side of the sixth lens group G6.

An intermediate image is formed by the objective lens group 10 in the vicinity of the position of an entrance surface 2A' of the second prism 22, and a field frame 11 is located in the vicinity of that entrance surface 2A'.

The first prism 21 is constructed such that after passing successively through the first lens group G1, the second lens group G2 and the third lens group G3 in the objective lens group 10, a light axis is entered in the first prism 21 from its entrance surface 1A' in such a way as not to cross over itself in the first prism 21, and then reflected at its optical surface 1B', finally leaving its optical surface 1C'. The second prism 22 is constructed such that the light axis leaving the first prism 21 is entered in the second prism 22 from its entrance surface 2A', and then reflected at its optical surfaces 2B' and 2C' in this order, finally leaving its optical surface 2D' after a light axis directed to the optical surface 2B' and a light axis reflected at the optical surface 2C' have crossed over each other in the second prism 22. The optical surface 1B' is defined by a roof reflecting portion while the optical surface 2B' and 2C' are applied with mirror coatings, and the refracting surfaces and reflecting surfaces are all defined by surfaces of rotationally symmetric curvature including a plane.

The angles of the optical surfaces 1A' to 1C' of the first prism 21 and the angles of the optical surfaces 2A' to 2D' of the second prism 22 are determined such that the light axis entering the optical surface 1A' is parallel with the light axis emerging from the optical surface 2D'.

For zooming by the objective lens group 10 from the wide-angle to the telephoto end, the second lens group G2 and the third lens group G3 are moved while the first lens group G1 and the fourth lens group G4 remain fixed.

In FIG. 10, EP is indicative of the exit pupil (eye point). As shown in FIGS. 11(a), 11(b) and 11(c), the objective lens group 10 in the real image type finder optical system of Example 9 is made up of a first lens group G1 consisting of a double-concave negative single lens, a second lens group G2 consisting of a double-convex positive single lens, a third lens group G3 consisting of a positive meniscus single lens concave on its object side and a fourth lens group G4 consisting of a first prism 21 that is equivalent in construction to a planoconcave negative single lens. The eyepiece lens group 30 is made up of a fifth lens group G5 consisting of a second prism 22 that is equivalent in construction to a planoconvex positive single lens and a sixth lens group G6 consisting of a double-convex positive single lens. A field frame 11 is located at the position of the entrance side-surface in the vicinity of the fifth lens group G5, and a cover glass 12 formed of a plane-parallel plate is located on the viewing side of the sixth lens group G6.

Six aspheric surfaces are located; one at the entrance side-surface of the first lens group G1, one at the entrance side-surface of the second lens group G2, two at both surfaces of the third lens group G3, one at the entrance side-surface of the fourth lens group G4, and one at the entrance side-surface of the sixth lens group G6.

Upon zooming from the wide-angle to the telephoto end, the first lens group G1 remains fixed, the second lens group G2 moves monotonously toward the object side, and the third lens group G3 moves toward the object side while the spacing between the second lens group G2 and the third lens group G3 becomes first wide and then narrow. The spacing between the second lens group G2 and the third lens group G3 is narrower at the telephoto end than at the wide-angle end.

Numerical data on Examples 1 to 9 are given below. Symbols used hereinafter but not hereinbefore have the following meanings.

EP: eye point
ω: half angle of view
WE: wide-angle end
ST: intermediate state
TE: telephoto end
$r_1, r_2, \ldots$ : radius of curvature of each lens surface
$d_1, d_2, \ldots$ : spacing between lens surfaces
$n_{d1}, n_{d2}, \ldots$ : d-line refractive index of each lens
$\nu_{d1}, \nu_{d2}, \ldots$ : Abbe number of each lens Assume now that x is an optical axis provided that the direction of propagation of light is positive, and y is a direction perpendicular to the optical axis. Then, the aspheric surface shape is given by $$x=(y^2/r)/[1+[1-(K+1)(y/r)^2]^{1/2}]+A_4y^4+A_6y^6+A_8y^8+A_{10}y^{10}$$

Here r is a paraxial radius of curvature, K is a conical coefficient, and $A_4$, $A_6$, $A_8$ and $A_{10}$ are the 4-th, 6-th, 8-th and 10-th aspheric coefficients.

EXAMPLE 1

$r_1 = -18.0911$ (Aspheric)  $d_1 = 0.9000$  $n_{d1} = 1.58423$  $\nu_{d1} = 30.49$
$r_2 = 6.7300$  $d_2 = $ (Variable)
$r_3 = 8.3181$ (Aspheric)  $d_3 = 1.5582$  $n_{d2} = 1.49241$  $\nu_{d2} = 57.66$
$r_4 = -55.3636$  $d_4 = $ (Variable)
$r_5 = 191.0571$ (Aspheric)  $d_5 = 2.0000$  $n_{d3} = 1.49241$  $\nu_{d3} = 57.66$
$r_6 = -7.9069$ (Aspheric)  $d_6 = $ (Variable)
$r_7 = -299.3629$ (Aspheric)  $d_7 = 16.0000$  $n_{d4} = 1.52542$  $\nu_{d4} = 55.78$
$r_8 = \infty$  $d_8 = 1.0000$
$r_9 = \infty$ (Field Mask)  $d_9 = 0.0000$
$r_{10} = 11.4261$  $d_{10} = 26.5585$  $n_{d5} = 1.52542$  $\nu_{d5} = 55.78$
$r_{11} = \infty$  $d_{11} = 1.5900$
$r_{12} = 13.9989$ (Aspheric)  $d_{12} = 2.2085$  $n_{d6} = 1.49241$  $\nu_{d6} = 57.66$
$r_{13} = -29.7212$  $d_{13} = 16.5051$
$r_{14} = \infty$ (EP)

Aspherical Coefficients

1st surface $K = 0$
$A_4 = 9.0776 \times 10^{-4}$
$A_6 = -4.9257 \times 10^{-5}$
$A_8 = 2.2184 \times 10^{-6}$
$A_{10} = -5.0746 \times 10^{-8}$ 3rd surface $K = 0$
$A_4 = -5.1580 \times 10^{-4}$
$A_6 = 1.4629 \times 10^{-5}$
$A_8 = -1.4558 \times 10^{-6}$
$A_{10} = 8.6849 \times 10^{-8}$ 5th surface $K = 0$
$A_4 = -1.5627 \times 10^{-3}$
$A_6 = -1.5963 \times 10^{-5}$
$A_8 = -3.2245 \times 10^{-7}$
$A_{10} = -3.8806 \times 10^{-7}$ 6th surface $K = 0$
$A_4 = -9.8635 \times 10^{-4}$
$A_6 = -1.2470 \times 10^{-5}$
$A_8 = -9.6845 \times 10^{-7}$
$A_{10} = -1.4109 \times 10^{-7}$ 7th surface $K = 0$
$A_4 = -3.3638 \times 10^{-4}$
$A_6 = -6.2764 \times 10^{-5}$
$A_8 = 1.3224 \times 10^{-5}$
$A_{10} = -8.0079 \times 10^{-7}$ 12th surface $K = 0$
$A_4 = -1.2112 \times 10^{-4}$
$A_6 = 1.9617 \times 10^{-6}$
$A_8 = -1.0533 \times 10^{-7}$
$A_{10} = 2.1184 \times 10^{-9}$ -continued Zooming Data

| | WE | ST | TE |
|---|---|---|---|
| $\omega$ (°) | 33.7 | 18.8 | 10.3 |
| $d_2$ | 11.65295 | 5.29364 | 2.19187 |
| $d_4$ | 4.05674 | 5.54887 | 0.87325 |
| $d_6$ | 0.43017 | 5.29733 | 13.07471 |

EXAMPLE 2

| | | | |
|---|---|---|---|
| $r_1 = -31.8517$ (Aspheric) | $d_1 = 0.9000$ | $n_{d1} = 1.58423$ | $\nu_{d1} = 30.49$ |
| $r_2 = 6.2236$ | $d_2 =$ (Variable) | | |
| $r_3 = 7.9334$ (Aspheric) | $d_3 = 1.8000$ | $n_{d2} = 1.49241$ | $\nu_{d2} = 57.66$ |
| $r_4 = -27.4904$ | $d_4 =$ (Variable) | | |
| $r_5 = -33.9608$ (Aspheric) | $d_5 = 2.0000$ | $n_{d3} = 1.49241$ | $\nu_{d3} = 57.66$ |
| $r_6 = -8.0357$ (Aspheric) | $d_6 =$ (Variable) | | |
| $r_7 = -61.3437$ (Aspheric) | $d_7 = 16.5000$ | $n_{d4} = 1.52542$ | $\nu_{d4} = 55.78$ |
| $r_8 = \infty$ | $d_8 = 1.5000$ | | |
| $r_9 = \infty$ (Field Mask) | $d_9 = 0.0000$ | | |
| $r_{10} = 12.1465$ | $d_{10} = 26.5585$ | $n_{d5} = 1.52542$ | $\nu_{d5} = 55.78$ |
| $r_{11} = \infty$ | $d_{11} = 1.5900$ | | |
| $r_{12} = 14.8710$ (Aspheric) | $d_{12} = 2.2085$ | $n_{d6} = 1.49241$ | $\nu_{d6} = 57.66$ |
| $r_{13} = -26.6693$ | $d_{13} = 16.5051$ | | |
| $r_{14} = \infty$ (EP) | | | |

Aspherical Coefficients

1st surface

K = 0.1446
$A_4 = 6.6909 \times 10^{-4}$
$A_6 = -2.2618 \times 10^{-5}$
$A_8 = 4.7659 \times 10^{-7}$
$A_{10} = -1.0674 \times 10^{-8}$ 3rd surface K = −0.1875
$A_4 = -2.7003 \times 10^{-4}$
$A_6 = -4.3632 \times 10^{-6}$
$A_8 = 5.8423 \times 10^{-8}$
$A_{10} = 1.8530 \times 10^{-9}$ 5th surface K = 0.6878
$A_4 = -1.3558 \times 10^{-3}$
$A_6 = -4.6245 \times 10^{-6}$
$A_8 = -1.6080 \times 10^{-6}$
$A_{10} = 5.5281 \times 10^{-8}$ 6th surface K = −0.2305
$A_4 = -8.9562 \times 10^{-4}$
$A_6 = 1.0077 \times 10^{-5}$
$A_8 = -2.1339 \times 10^{-6}$
$A_{10} = 6.4962 \times 10^{-8}$ 7th surface K = 4.9934
$A_4 = -4.9997 \times 10^{-4}$
$A_6 = -1.8420 \times 10^{-5}$
$A_8 = 3.4308 \times 10^{-6}$
$A_{10} = -1.7383 \times 10^{-7}$ 12th surface K = 0
$A_4 = -1.2911 \times 10^{-4}$
$A_6 = 2.9236 \times 10^{-6}$
$A_8 = -1.2886 \times 10^{-7}$
$A_{10} = 2.2253 \times 10^{-9}$ -continued Zooming Data

| | WE | ST | TE |
|---|---|---|---|
| $\omega$ (°) | 34.0 | 18.9 | 10.4 |
| $d_2$ | 13.91988 | 7.46372 | 2.99202 |
| $d_4$ | 1.53727 | 4.77663 | 1.15391 |
| $d_6$ | 0.44085 | 3.65770 | 11.75207 |

EXAMPLE 3

| | | | |
|---|---|---|---|
| $r_1 = -278.8859$ (Aspheric) | $d_1 = 0.9000$ | $n_{d1} = 1.58423$ | $\nu_{d1} = 30.49$ |
| $r_2 = 5.8910$ | $d_2 =$ (Variable) | | |
| $r_3 = 9.2024$ (Aspheric) | $d_3 = 1.8000$ | $n_{d2} = 1.49241$ | $\nu_{d2} = 57.66$ |
| $r_4 = -12.3550$ | $d_4 =$ (Variable) | | |
| $r_5 = -15.0674$ (Aspheric) | $d_5 = 2.0000$ | $n_{d3} = 1.49241$ | $\nu_{d3} = 57.66$ |
| $r_6 = -8.4361$ (Aspheric) | $d_6 =$ (Variable) | | |
| $r_7 = -155.7875$ (Aspheric) | $d_7 = 16.5000$ | $n_{d4} = 1.52542$ | $\nu_{d4} = 55.78$ |
| $r_8 = \infty$ | $d_8 = 1.5000$ | | |
| $r_9 = \infty$ (Field Mask) | $d_9 = 0.0000$ | | |
| $r_{10} = 12.1465$ | $d_{10} = 26.5585$ | $n_{d5} = 1.52542$ | $\nu_{d5} = 55.78$ |
| $r_{11} = \infty$ | $d_{11} = 1.5900$ | | |
| $r_{12} = 14.8710$ (Aspheric) | $d_{12} = 2.2085$ | $n_{d6} = 1.49241$ | $\nu_{d6} = 57.66$ |
| $r_{13} = -26.6693$ | $d_{13} = 16.5051$ | | |
| $r_{14} = \infty$ (EP) | | | |

Aspherical Coefficients

1st surface

K = −8.5185
$A_4 = 5.8854 \times 10^{-4}$
$A_6 = -3.6849 \times 10^{-5}$
$A_8 = 1.6971 \times 10^{-6}$
$A_{10} = -3.6526 \times 10^{-8}$ 3rd surface K = −0.4315
$A_4 = -3.3893 \times 10^{-4}$
$A_6 = 3.2984 \times 10^{-5}$
$A_8 = -4.5129 \times 10^{-6}$
$A_{10} = 1.8050 \times 10^{-7}$ 5th surface K = 2.6021
$A_4 = -1.5683 \times 10^{-3}$
$A_6 = 7.3931 \times 10^{-5}$
$A_8 = -4.9558 \times 10^{-6}$
$A_{10} = 1.3062 \times 10^{-8}$ 6th surface K = 0.2767
$A_4 = -1.1918 \times 10^{-3}$
$A_6 = 4.8692 \times 10^{-5}$
$A_8 = -3.2635 \times 10^{-6}$
$A_{10} = 5.4969 \times 10^{-8}$ 7th surface K = 29.4891
$A_4 = -4.0078 \times 10^{-4}$
$A_6 = -4.7622 \times 10^{-5}$
$A_8 = 5.7449 \times 10^{-6}$
$A_{10} = -2.5333 \times 10^{-7}$ 12th surface K = 0
$A_4 = -1.2911 \times 10^{-4}$
$A_6 = 2.9236 \times 10^{-6}$
$A_8 = -1.2886 \times 10^{-7}$
$A_{10} = 2.2253 \times 10^{-9}$ -continued Zooming Data

| | WE | ST | TE |
|---|---|---|---|
| $\omega$ (°) | 34.0 | 18.9 | 10.4 |
| $d_2$ | 14.80960 | 8.50061 | 3.14673 |
| $d_4$ | 0.56953 | 6.37074 | 1.58163 |
| $d_6$ | 0.51888 | 1.02666 | 11.16964 |

EXAMPLE 4

$r_1 = -39.5331$ (Aspheric)   $d_1 = 0.9000$   $n_{d1} = 1.58423$   $\nu_{d1} = 30.49$
$r_2 = 6.1924$   $d_2 =$ (Variable)
$r_3 = 8.0577$ (Aspheric)   $d_3 = 2.0000$   $n_{d2} = 1.49241$   $\nu_{d2} = 57.66$
$r_4 = -21.4306$   $d_4 =$ (Variable)
$r_5 = -27.2090$ (Aspheric)   $d_5 = 1.4000$   $n_{d3} = 1.49241$   $\nu_{d3} = 57.66$
$r_6 = -8.6060$ (Aspheric)   $d_6 =$ (Variable)
$r_7 = -74.4881$ (Aspheric)   $d_7 = 16.5000$   $n_{d4} = 1.52542$   $\nu_{d4} = 55.78$
$r_8 = \infty$   $d_8 = 1.5000$
$r_9 = \infty$ (Field Mask)   $d_9 = 0.0000$
$r_{10} = 12.1465$   $d_{10} = 26.5585$   $n_{d5} = 1.52542$   $\nu_{d5} = 55.78$
$r_{11} = \infty$   $d_{11} = 1.5900$
$r_{12} = 14.8710$ (Aspheric)   $d_{12} = 2.2085$   $n_{d6} = 1.49241$   $\nu_{d6} = 57.66$
$r_{13} = -26.6693$   $d_{13} = 16.5051$
$r_{14} = \infty$ (EP)

Aspherical Coefficients

1st surface $K = 4.9278$
$A_4 = 6.4599 \times 10^{-4}$
$A_6 = -2.6805 \times 10^{-5}$
$A_8 = 1.0757 \times 10^{-6}$
$A_{10} = -3.0026 \times 10^{-8}$ 3rd surface $K = -0.2283$
$A_4 = -2.8020 \times 10^{-4}$
$A_6 = 1.4291 \times 10^{-5}$
$A_8 = -3.2097 \times 10^{-6}$
$A_{10} = 1.1019 \times 10^{-7}$ 5th surface $K = 2.8222$
$A_4 = -1.7326 \times 10^{-3}$
$A_6 = -1.9295 \times 10^{-6}$
$A_8 = 1.8544 \times 10^{-6}$
$A_{10} = -6.4513 \times 10^{-8}$ 6th surface $K = -0.4983$
$A_4 = -1.4325 \times 10^{-3}$
$A_6 = 2.2979 \times 10^{-5}$
$A_8 = -1.5442 \times 10^{-6}$
$A_{10} = 3.4532 \times 10^{-8}$ 7th surface $K = 30.3473$
$A_4 = -4.8444 \times 10^{-4}$
$A_6 = -3.0980 \times 10^{-5}$
$A_8 = 7.3770 \times 10^{-6}$
$A_{10} = -4.9838 \times 10^{-7}$ 12th surface $K = 0$
$A_4 = -1.2911 \times 10^{-4}$
$A_6 = 2.9236 \times 10^{-6}$
$A_8 = -1.2886 \times 10^{-7}$
$A_{10} = 2.2253 \times 10^{-9}$ -continued Zooming Data

| | WE | ST | TE |
|---|---|---|---|
| $\omega$ (°) | 34.0 | 18.9 | 10.4 |
| $d_2$ | 14.40449 | 7.97803 | 3.25480 |
| $d_4$ | 1.39613 | 5.12719 | 1.26638 |
| $d_6$ | 0.49738 | 3.19286 | 11.77683 |

EXAMPLE 5

$r_1 = -24.1379$ (Aspheric)   $d_1 = 0.9000$   $n_{d1} = 1.58423$   $\nu_{d1} = 30.49$
$r_2 = 6.4942$   $d_2 =$ (Variable)
$r_3 = 7.2467$ (Aspheric)   $d_3 = 1.6000$   $n_{d2} = 1.49241$   $\nu_{d2} = 57.66$
$r_4 = -35.2434$   $d_4 =$ (Variable)
$r_5 = -11.7752$ (Aspheric)   $d_5 = 1.4000$   $n_{d3} = 1.49241$   $\nu_{d3} = 57.66$
$r_6 = -5.6824$ (Aspheric)   $d_6 =$ (Variable)
$r_7 = -55.6719$ (Aspheric)   $d_7 = 16.5000$   $n_{d4} = 1.52542$   $\nu_{d4} = 55.78$
$r_8 = \infty$   $d_8 = 1.5000$
$r_9 = \infty$ (Field Mask)   $d_9 = 0.0000$
$r_{10} = 10.6709$   $d_{10} = 26.5585$   $n_{d5} = 1.52542$   $\nu_{d5} = 55.78$
$r_{11} = \infty$   $d_{11} = 1.5900$
$r_{12} = 13.4799$ (Aspheric)   $d_{12} = 2.2085$   $n_{d6} = 1.49241$   $\nu_{d6} = 57.66$
$r_{13} = -32.3369$   $d_{13} = 16.5051$
$r_{14} = \infty$ (EP)

Aspherical Coefficients

1st surface $K = 0.1988$
$A_4 = 7.0888 \times 10^{-4}$
$A_6 = -1.6410 \times 10^{-5}$
$A_8 = -6.4433 \times 10^{-7}$
$A_{10} = 3.1423 \times 10^{-8}$ 3rd surface $K = 0.0091$
$A_4 = -5.1070 \times 10^{-4}$
$A_6 = 1.7524 \times 10^{-5}$
$A_8 = -3.5510 \times 10^{-6}$
$A_{10} = 1.5401 \times 10^{-7}$ 5th surface $K = -0.5258$
$A_4 = -3.2334 \times 10^{-3}$
$A_6 = -4.0837 \times 10^{-5}$
$A_8 = -1.5690 \times 10^{-6}$
$A_{10} = -1.3981 \times 10^{-6}$ 6th surface $K = -0.0316$
$A_4 = -1.9865 \times 10^{-3}$
$A_6 = 4.9861 \times 10^{-5}$
$A_8 = -1.1975 \times 10^{-5}$
$A_{10} = -9.6281 \times 10^{-8}$ 7th surface $K = 0.4505$
$A_4 = -1.5732 \times 10^{-4}$
$A_6 = -1.2843 \times 10^{-4}$
$A_8 = 2.4500 \times 10^{-5}$
$A_{10} = -1.6615 \times 10^{-6}$ 12th surface $K = 0.2635$
$A_4 = -1.5685 \times 10^{-4}$
$A_6 = 2.5202 \times 10^{-6}$
$A_8 = -8.7359 \times 10^{-8}$
$A_{10} = 1.5559 \times 10^{-9}$

| -continued | | | |
|---|---|---|---|
| | Zooming Data | | |
| | WE | ST | TE |
| ω (°) | 38.2 | 18.8 | 9.6 |
| $d_2$ | 15.10351 | 7.46069 | 2.63052 |
| $d_4$ | 1.23768 | 5.58460 | 0.95501 |
| $d_6$ | 0.35750 | 3.65271 | 13.11247 |

| -continued | | | |
|---|---|---|---|
| | Zooming Data | | |
| | WE | ST | TE |
| ω (°) | 33.3 | 18.7 | 10.3 |
| $d_2$ | 13.64794 | 7.43182 | 2.61902 |
| $d_4$ | 1.67520 | 5.57019 | 1.06451 |
| $d_6$ | 0.57596 | 2.89709 | 12.21557 |

EXAMPLE 6

$r_1 = -38.6400$ (Aspheric)　$d_1 = 0.9000$　$n_{d1} = 1.58393$　$\nu_{d1} = 30.21$
$r_2 = 6.1300$　$d_2 = $ (Variable)
$r_3 = 8.1600$ (Aspheric)　$d_3 = 1.8000$　$n_{d2} = 1.49280$　$\nu_{d2} = 57.84$
$r_4 = -16.1600$　$d_4 = $ (Variable)
$r_5 = -8.5700$ (Aspheric)　$d_5 = 2.0000$　$n_{d3} = 1.49280$　$\nu_{d3} = 57.84$
$r_6 = -5.4200$　$d_6 = $ (Variable)
$r_7 = -80.0300$ (Aspheric)　$d_7 = 16.5000$　$n_{d4} = 1.52542$　$\nu_{d4} = 55.78$
$r_8 = \infty$　$d_8 = 1.3050$
$r_9 = \infty$ (Field Mask)　$d_9 = 0.1500$
$r_{10} = 10.9500$　$d_{10} = 26.5585$　$n_{d5} = 1.52542$　$\nu_{d5} = 55.78$
$r_{11} = \infty$　$d_{11} = 1.6190$
$r_{12} = 13.4000$ (Aspheric)　$d_{12} = 2.2100$　$n_{d6} = 1.49280$　$\nu_{d6} = 57.84$
$r_{13} = -33.4100$　$d_{13} = 16.6181$
$r_{14} = \infty$ (EP)

Aspherical Coefficients

1st surface

K = 10.6515
$A_4 = 6.9488 \times 10^{-4}$
$A_6 = -1.6434 \times 10^{-5}$
$A_8 = -3.4450 \times 10^{-7}$
$A_{10} = 1.9021 \times 10^{-8}$ 3rd surface K = −0.4703
$A_4 = -1.9506 \times 10^{-4}$
$A_6 = -2.5599 \times 10^{-5}$
$A_8 = 3.6028 \times 10^{-6}$
$A_{10} = -1.5816 \times 10^{-7}$ 5th surface K = 1.8000
$A_4 = -2.5423 \times 10^{-3}$
$A_6 = 1.3090 \times 10^{-4}$
$A_8 = -3.1269 \times 10^{-5}$
$A_{10} = 1.3399 \times 10^{-6}$ 6th surface K = −0.1185
$A_4 = -1.4951 \times 10^{-3}$
$A_6 = 8.9294 \times 10^{-5}$
$A_8 = -1.6248 \times 10^{-5}$
$A_{10} = 6.6969 \times 10^{-7}$ 7th surface K = 21.8522
$A_4 = -2.6919 \times 10^{-4}$
$A_6 = -9.8453 \times 10^{-5}$
$A_8 = 2.0592 \times 10^{-5}$
$A_{10} = -1.4274 \times 10^{-6}$ 12th surface K = 0.3323
$A_4 = -1.6595 \times 10^{-4}$
$A_6 = 3.1074 \times 10^{-6}$
$A_8 = -1.3513 \times 10^{-7}$
$A_{10} = 2.6337 \times 10^{-9}$

EXAMPLE 7

$r_1 = -24.1379$ (Aspheric)　$d_1 = 0.8000$　$n_{d1} = 1.58423$　$\nu_{d1} = 30.49$
$r_2 = 6.4942$　$d_2 = $ (Variable)
$r_3 = 7.2467$ (Aspheric)　$d_3 = 1.6000$　$n_{d2} = 1.49241$　$\nu_{d2} = 57.66$
$r_4 = -35.2434$　$d_4 = $ (Variable)
$r_5 = -11.7752$ (Aspheric)　$d_5 = 1.4000$　$n_{d3} = 1.49241$　$\nu_{d3} = 57.66$
$r_6 = -5.6824$　$d_6 = $ (Variable)
$r_7 = -55.6719$ (Aspheric)　$d_7 = 16.5000$　$n_{d4} = 1.52542$　$\nu_{d4} = 55.78$
$r_8 = \infty$　$d_8 = 1.5000$
$r_9 = \infty$ (Field Mask)　$d_9 = 0.0000$
$r_{10} = 10.6709$　$d_{10} = 26.5585$　$n_{d5} = 1.52542$　$\nu_{d5} = 55.78$
$r_{11} = \infty$　$d_{11} = 1.5900$
$r_{12} = 13.4799$ (Aspheric)　$d_{12} = 2.2085$　$n_{d6} = 1.49241$　$\nu_{d6} = 57.66$
$r_{13} = -32.3369$　$d_{13} = 16.5051$
$r_{14} = \infty$ (EP)

Aspherical Coefficients

1st surface

K = 4.9636
$A_4 = 7.6195 \times 10^{-4}$
$A_6 = -2.0614 \times 10^{-5}$
$A_8 = -2.2491 \times 10^{-7}$
$A_{10} = 1.8818 \times 10^{-8}$ 3rd surface K = −0.2552
$A_4 = -2.9970 \times 10^{-4}$
$A_6 = -3.5428 \times 10^{-5}$
$A_8 = 1.0106 \times 10^{-5}$
$A_{10} = -8.5473 \times 10^{-7}$ 5th surface K = 2.9499
$A_4 = -3.4133 \times 10^{-3}$
$A_6 = 4.6222 \times 10^{-5}$
$A_8 = -3.0059 \times 10^{-5}$
$A_{10} = 1.1889 \times 10^{-6}$ 6th surface K = −0.5439
$A_4 = -2.4817 \times 10^{-3}$
$A_6 = 5.1303 \times 10^{-6}$
$A_8 = -1.0905 \times 10^{-5}$
$A_{10} = 1.4820 \times 10^{-7}$ 7th surface K = 34.5569
$A_4 = -3.9465 \times 10^{-4}$
$A_6 = -7.2651 \times 10^{-6}$
$A_8 = 4.8937 \times 10^{-6}$
$A_{10} = -4.4600 \times 10^{-7}$ 12th surface K = 0.2635
$A_4 = -1.5685 \times 10^{-4}$
$A_6 = 2.5202 \times 10^{-6}$
$A_8 = -8.7359 \times 10^{-8}$
$A_{10} = 1.5559 \times 10^{-9}$ -continued

Zooming Data

|  | WE | ST | TE |
|---|---|---|---|
| $\omega$ (°) | 38.6 | 26.0 | 18.4 |
| $d_2$ | 14.93313 | 10.85771 | 7.13029 |
| $d_4$ | 0.74729 | 3.96274 | 5.00685 |
| $d_6$ | 0.51958 | 1.37955 | 4.06086 |

EXAMPLE 8

| | | | |
|---|---|---|---|
| $r_1 = -36.5066$ (Aspheric) | $d_1 = 0.9000$ | $n_{d1} = 1.58423$ | $\nu_{d1} = 30.49$ |
| $r_2 = 5.9667$ | $d_2 =$ (Variable) | | |
| $r_3 = 8.5741$ (Aspheric) | $d_3 = 2.0000$ | $n_{d2} = 1.49241$ | $\nu_{d2} = 57.66$ |
| $r_4 = -15.8709$ | $d_4 =$ (Variable) | | |
| $r_5 = -15.9340$ (Aspheric) | $d_5 = 1.4000$ | $n_{d3} = 1.49241$ | $\nu_{d3} = 57.66$ |
| $r_6 = -7.3368$ (Aspheric) | $d_6 =$ (Variable) | | |
| $r_7 = -67.4015$ (Aspheric) | $d_7 = 16.5000$ | $n_{d4} = 1.52542$ | $\nu_{d4} = 55.78$ |
| $r_8 = \infty$ | $d_8 = 1.5000$ | | |
| $r_9 = \infty$ (Field Mask) | $d_9 = 0.0000$ | | |
| $r_{10} = 12.1465$ | $d_{10} = 26.5585$ | $n_{d5} = 1.52542$ | $\nu_{d5} = 55.78$ |
| $r_{11} = \infty$ | $d_{11} = 1.5900$ | | |
| $r_{12} = 14.8710$ (Aspheric) | $d_{12} = 2.2085$ | $n_{d6} = 1.49241$ | $\nu_{d6} = 57.66$ |
| $r_{13} = -26.6693$ | $d_{13} = 16.5051$ | | |
| $r_{14} = \infty$ (EP) | | | |

Aspherical Coefficients

1st surface $K = 5.5000$
$A_4 = 8.3624 \times 10^{-4}$
$A_6 = -3.8635 \times 10^{-5}$
$A_8 = 1.4750 \times 10^{-6}$
$A_{10} = -3.0734 \times 10^{-8}$ 3rd Surface $K = -0.2549$
$A_4 = -3.4020 \times 10^{-4}$
$A_6 = 1.7930 \times 10^{-5}$
$A_8 = -3.1843 \times 10^{-6}$
$A_{10} = 1.5415 \times 10^{-7}$ 5th surface $K = 3.1601$
$A_4 = -2.4776 \times 10^{-3}$
$A_6 = 8.8365 \times 10^{-5}$
$A_8 = -2.5721 \times 10^{-5}$
$A_{10} = 1.2074 \times 10^{-6}$ 6th surface $K = -0.4288$
$A_4 = -2.0889 \times 10^{-3}$
$A_6 = 8.1637 \times 10^{-5}$
$A_8 = -1.8258 \times 10^{-5}$
$A_{10} = 7.7077 \times 10^{-7}$ 7th surface $K = 31.4740$
$A_4 = -4.0835 \times 10^{-4}$
$A_6 = -5.1169 \times 10^{-5}$
$A_8 = 8.1818 \times 10^{-6}$
$A_{10} = -3.8434 \times 10^{-7}$ 12th surface $K = 0$
$A_4 = -1.2911 \times 10^{-4}$
$A_6 = 2.9236 \times 10^{-6}$
$A_8 = -1.2886 \times 10^{-7}$
$A_{10} = 2.2253 \times 10^{-9}$ -continued

Zooming Data

|  | WE | ST | TE |
|---|---|---|---|
| $\omega$ (°) | 28.6 | 20.1 | 14.2 |
| $d_2$ | 11.94215 | 8.22243 | 5.05671 |
| $d_4$ | 2.75774 | 4.50180 | 3.25951 |
| $d_6$ | 1.00012 | 2.97577 | 7.38378 |

EXAMPLE 9

| | | | |
|---|---|---|---|
| $r_1 = -16.7700$ (Aspheric) | $d_1 = 0.8500$ | $n_{d1} = 1.58423$ | $\nu_{d1} = 30.49$ |
| $r_2 = 12.2000$ | $d_2 =$ (Variable) | | |
| $r_3 = 8.9000$ (Aspheric) | $d_3 = 2.0800$ | $n_{d2} = 1.49236$ | $\nu_{d2} = 57.86$ |
| $r_4 = -15.7500$ | $d_4 =$ (Variable) | | |
| $r_5 = -44.5900$ (Aspheric) | $d_5 = 1.1500$ | $n_{d3} = 1.49236$ | $\nu_{d3} = 57.86$ |
| $r_6 = -12.5400$ (Aspheric) | $d_6 =$ (Variable) | | |
| $r_7 = -45.8400$ (Aspheric) | $d_7 = 10.0000$ | $n_{d4} = 1.52542$ | $\nu_{d4} = 55.78$ |
| $r_8 = \infty$ | $d_8 = 6.2544$ | | |
| $r_9 = \infty$ (Field Mask) | $d_9 = 0.1500$ | | |
| $r_{10} = 10.9500$ | $d_{10} = 26.5585$ | $n_{d5} = 1.52542$ | $\nu_{d5} = 55.78$ |
| $r_{11} = \infty$ | $d_{11} = 1.5200$ | | |
| $r_{12} = 13.4000$ (Aspheric) | $d_{12} = 2.2800$ | $n_{d6} = 1.49236$ | $\nu_{d6} = 57.86$ |
| $r_{13} = -33.4100$ | $d_{13} = 1.7010$ | | |
| $r_{14} = \infty$ | $d_{14} = 1.2000$ | $n_{d7} = 1.49236$ | $\nu_{d6} = 57.86$ |
| $r_{15} = \infty$ | $d_{15} = 14.1130$ | | |
| $r_{16} = \infty$ (EP) | | | |

Aspherical Coefficients

1st surface $K = 0$
$A_4 = 4.3834 \times 10^{-4}$
$A_6 = -5.2244 \times 10^{-5}$
$A_8 = 5.7692 \times 10^{-6}$
$A_{10} = -2.9732 \times 10^{-7}$ 3rd surface $K = 0$
$A_4 = -4.0189 \times 10^{-4}$
$A_6 = -1.7989 \times 10^{-5}$
$A_8 = 2.7619 \times 10^{-6}$
$A_{10} = -1.2641 \times 10^{-7}$ 5th surface $K = 0$
$A_4 = -1.4866 \times 10^{-3}$
$A_6 = 1.7318 \times 10^{-4}$
$A_8 = -2.4782 \times 10^{-5}$
$A_{10} = 1.1313 \times 10^{-6}$ 6th surface $K = 0$
$A_4 = -1.1554 \times 10^{-3}$
$A_6 = 1.2023 \times 10^{-4}$
$A_8 = -1.7349 \times 10^{-5}$
$A_{10} = 7.7670 \times 10^{-7}$ 7th surface $K = 0$
$A_4 = -1.7348 \times 10^{-4}$
$A_6 = -5.8968 \times 10^{-5}$
$A_8 = 1.4300 \times 10^{-5}$
$A_{10} = -1.0460 \times 10^{-6}$ 12th surface $K = 0.3323$
$A_4 = -1.6595 \times 10^{-4}$
$A_6 = 3.1074 \times 10^{-6}$
$A_8 = -1.3513 \times 10^{-7}$
$A_{10} = 2.6337 \times 10^{-9}$ -continued Zooming Data

| | WE | ST | TE |
|---|---|---|---|
| ω (°) | 25.2 | 13.1 | 7.0 |
| $d_2$ | 12.98250 | 5.92446 | 0.89388 |
| $d_4$ | 1.68884 | 6.45319 | 0.46255 |
| $d_6$ | 1.26666 | 3.56035 | 14.58157 |

Figure 12A:
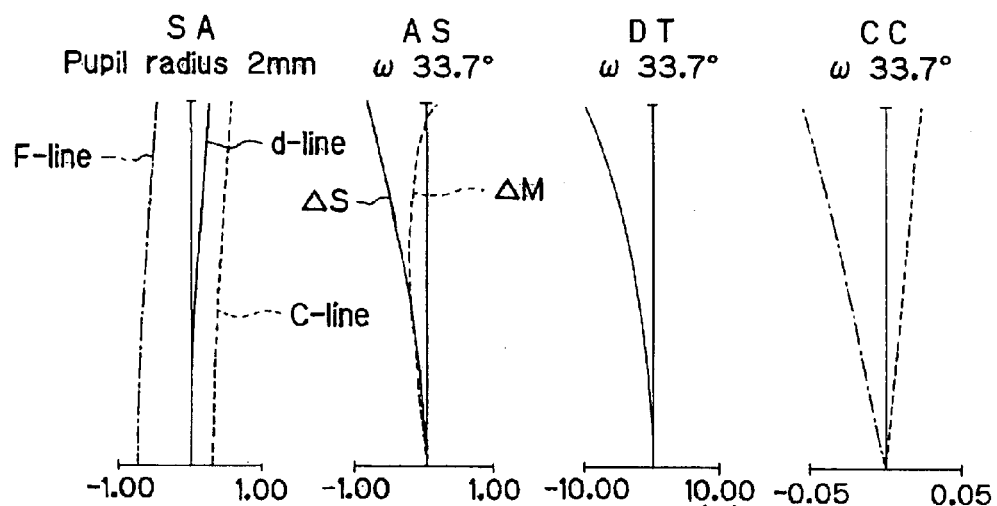
FIGS. 12(*a*), 12(*b*) and 12(*c*) are aberration diagrams for Example 1 with respect to an infinite object point.
Figure 12B:
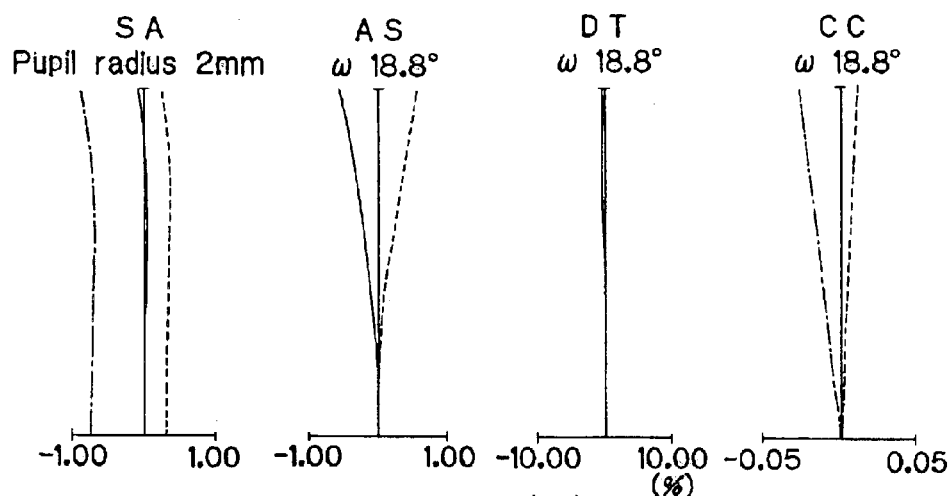
Figure 12C:
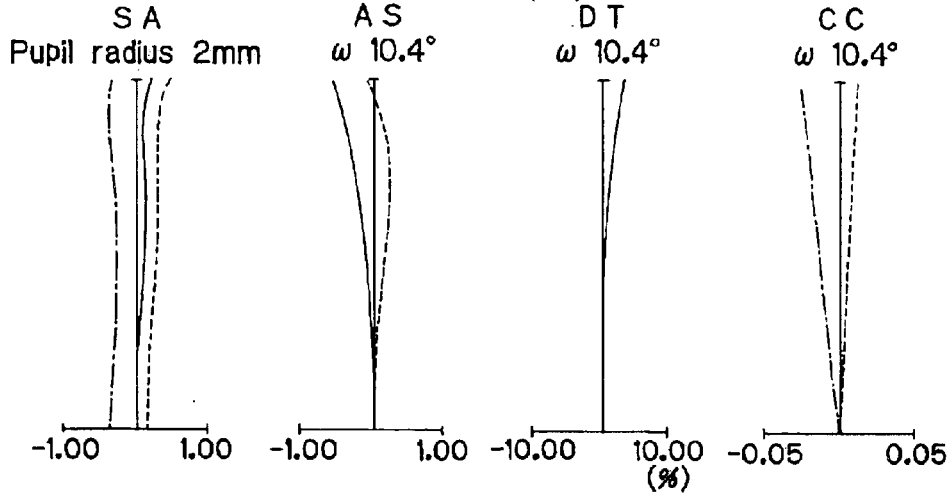
Figure 13A:
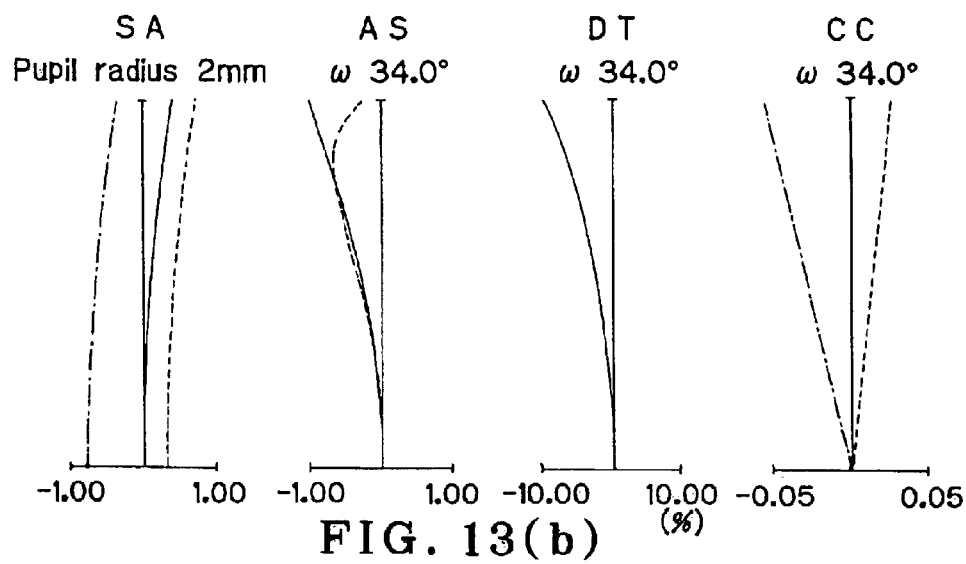
FIGS. 13(*a*), 13(*b*) and 13(*c*) are aberration diagrams for Example 2 with respect to an infinite object point.
Figure 13B:
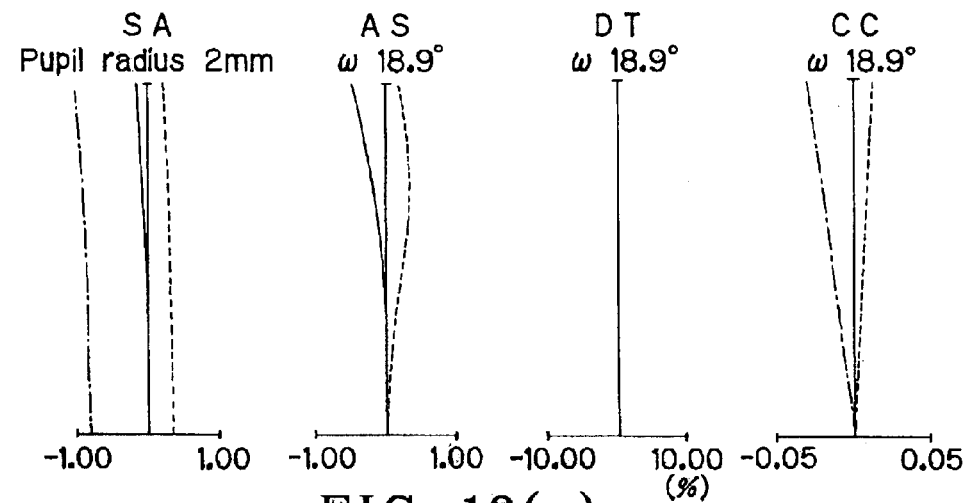
Figure 13C:
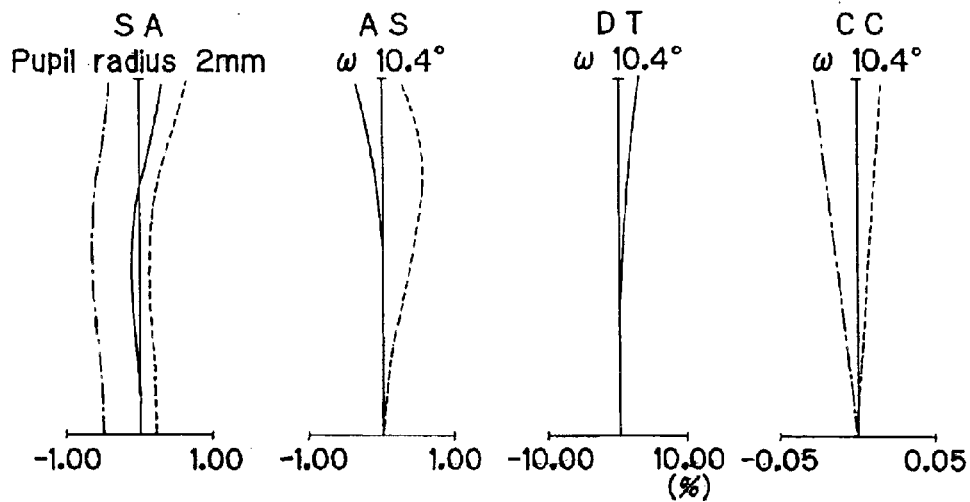
Figure 14A:
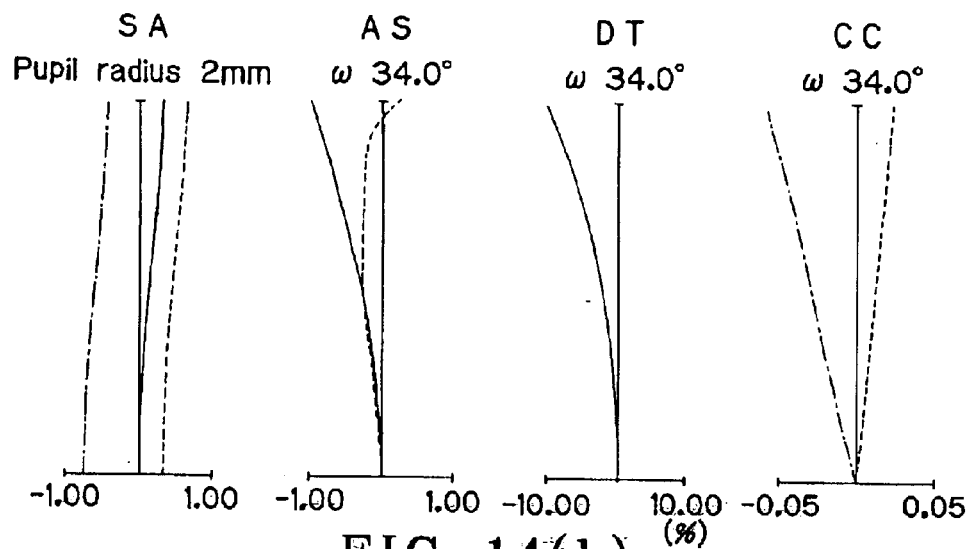
FIGS. 14(*a*), 14(*b*) and 14(*c*) are aberration diagrams for Example 3 with respect to an infinite object point.
Figure 14B:
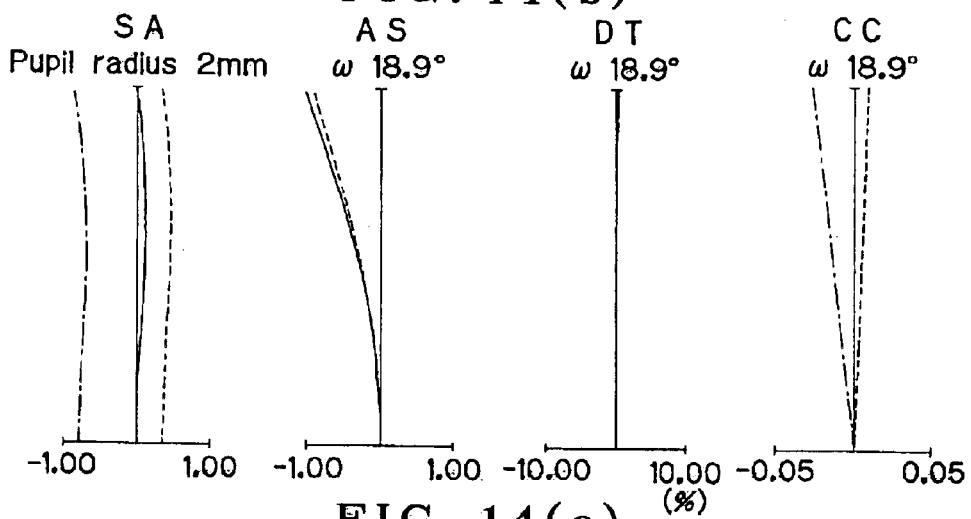
Figure 14C:
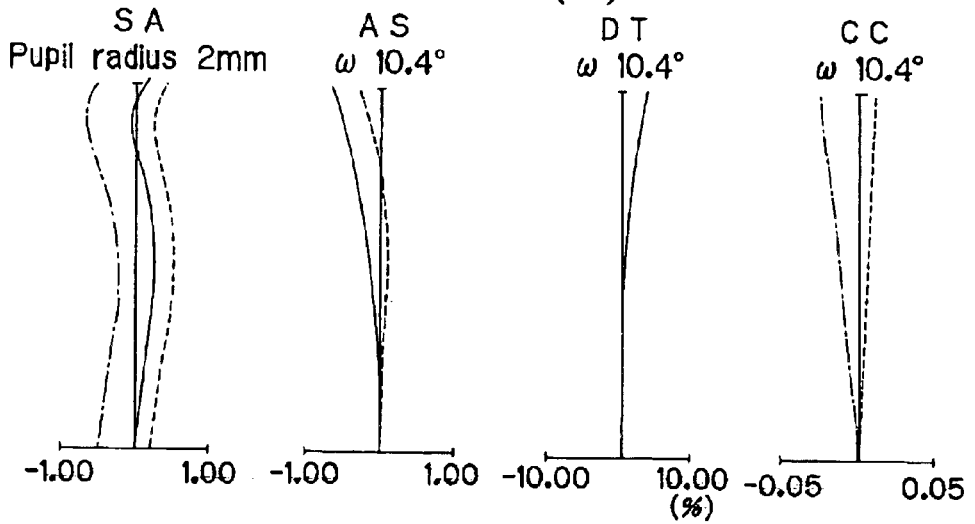

Aberration diagrams for Example 1 to 3 with respect to an infinite object point are shown in FIGS. 12 to 14. In these aberration diagrams, (a), (b) and (c) are indicative of spherical aberrations SA, astigmatism AS, distortion DT and chromatic aberration of magnification CC at the wide-angle end, in the intermediate state and at the telephoto end, respectively. It is noted that the aberration diagrams are representative of aberrations produced when an aberration-free image-formation lens is located the position of an exit pupil EP.

The values of conditions (1) to (8) and (11) in Examples 1 to 9 are enumerated just below.

| Condition | Example 1 | Example 2 | Example 3 | Example 4 | Example 5 | Example 6 | Example 7 | Example 8 | Example 9 |
|---|---|---|---|---|---|---|---|---|---|
| (1) | 2.1121066 | 2.0887121 | 2.2260611 | 2.1332979 | 2.2769455 | 2.1299974 | 2.3093545 | 1.88061 | 1.6019762 |
| (2) | −0.778049 | −0.898672 | −0.959118 | −0.916916 | −0.890928 | −0.906971 | −1.560568 | −1.04325 | −0.653679 |
| (3) | 1.039848 | 0.9301984 | 0.875886 | 0.9275863 | 0.9110692 | 0.957191 | 0.7082556 | 0.967223 | 0.7199891 |
| (4) | −1.495268 | −1.594371 | −1.780065 | −1.641908 | −1.732725 | −1.62306 | −1.734791 | −1.33981 | −1.547661 |
| (5) | 2.1030401 | 2.5121599 | 2.6727297 | 2.5996199 | 3.0200972 | 2.4629671 | 2.9860286 | 1.836971 | 1.6801470 |
| (6) | 6.785421 | 6.9658909 | 6.965891 | 6.9658908 | 7.7181943 | 6.9576417 | 7.5984808 | 5.845255 | 4.7136555 |
| (7) | 0.036915 | 0.0316709 | 0.0350367 | 0.0345292 | 0.02367 | 0.0422009 | 0.0347936 | 0.083747 | 0.097567 |
| (8) | 0.1238277 | 0.1690314 | 0.1777714 | 0.1838764 | 0.138441 | 0.147955 | 0.7129577 | 0.385979 | 0.0340914 |
| (11) | 3.1945488 | 3.1945497 | 3.1945475 | 3.1945497 | 3.7994404 | 3.1944792 | 1.9998001 | 2.015228 | 3.3933222 |

Throughout the aforesaid example, the third lens group G3 is moved toward the object side upon zooming from the wide-angle to the telephoto end. However, it is acceptable to move the third lens group G3 toward the object side once moved slightly to the eye side.

Figure 15:
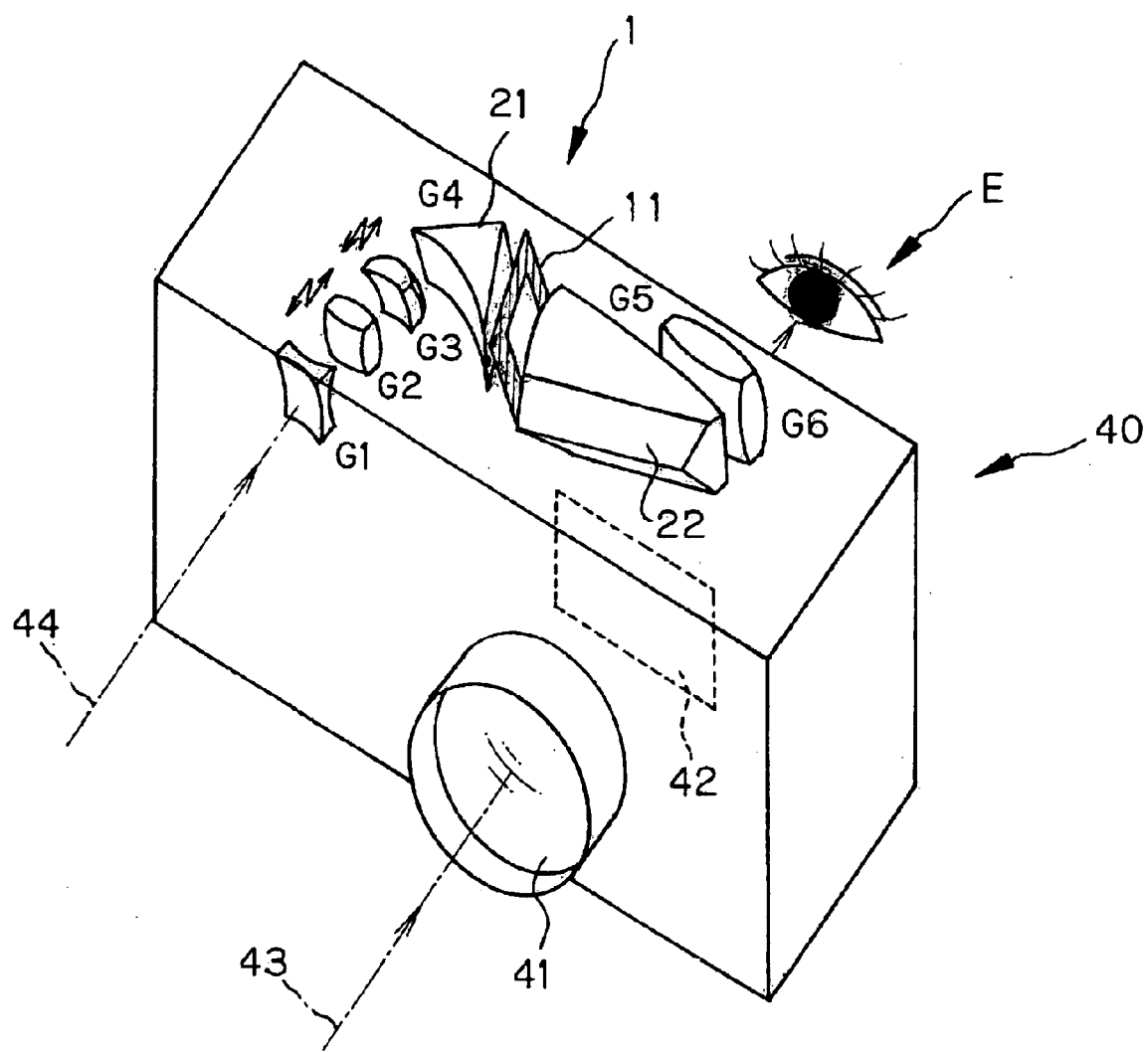
FIG. 15 is illustrative in perspective of a lens shutter camera or an electronic still camera in which the real image type finder optical system of the invention is built.

The real image type finder optical system of the invention, as explained above, may be used as the finder optical system for, e.g., a lens shutter camera or an electronic still camera. FIG. 15 is illustrative in perspective of such a lens shutter or electronic still camera 40 in which the real image type finder optical system of the invention is built. A taking objective optical system 41 is mounted on the front surface of the camera 40 and an electronic image pickup device or silver halide film 42 is located at the position of an image plane of the objective optical system 41 in the camera 40, so that via a light beam passing through a taking optical path 43, a subject image is taken and recorded on the electronic image pickup device or silver halide film 42. On the other hand, the same subject image entered through a finder optical path 44 substantially parallel with the taking optical path 43 is formed in the eye E of an observer from an eyepiece aperture in the back surface of the camera 40 through the real image type finder optical system 1 of the invention. As in the example, the real image type finder optical system 1 is constructed such that an optical path is bent in a horizontal or vertical plane in an image-inverting optical system 20 composed of a first prism 21 and a second prism 22 to make an incident light axis and an emergent light axis substantially parallel with each other, thereby making the finder optical system itself and the camera compact and slimming down them.

While the real image type finder optical system of the invention is effective for a finder having a zoom ratio of at least 1.9, it is particularly effective for a finder having a zoom ratio of 2.9 or greater. A more sophisticated system may be obtained by interposing a separate lens group in any space between the respective lens groups.

What is claimed is:

1. A real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and condition (1) is satisfied:

$$1.60 < f_{b(W)}/f_W < 3.0 \tag{1}$$

where $f_{b(W)}$ is a back focus of a composite system of the first lens group to the third lens group at the wide-angle end, and $f_W$ is a composite focal length of the first lens group to the fourth lens group at the wide-angle end.

2. A real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and condition (2) is satisfied:

$$-2.0 < (D_{1w} - D_{1t})/(f_w - f_t) < -0.7 \quad (2)$$

where $D_{1w}$, is an axial air separation between the first lens group and the second lens group at the wide-angle end, $D_{1t}$ is an axial air separation between the first lens group and the second lens group at the telephoto end, $f_w$ is a composite focal length of the first lens group to the fourth lens group at the wide-angle end, and $f_t$ is a composite focal length of the first lens group to the fourth lens group at the telephoto end.

3. A real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and condition (3) is satisfied:

$$0.89 < (D_{3w} - D_{3t})/(f_w - f_t) < 1.5 \quad (3)$$

where $D_{3w}$ is an axial air separation between the third lens group and the fourth lens group at the wide-angle end, $D_{3t}$ is an axial air separation between the third lens group and the fourth lens group at the telephoto end, fW is a composite focal length of the first lens group to the fourth lens group at the wide-angle end, and $f_t$ is a composite focal length of the first lens group to the fourth lens group at the telephoto end.

4. A real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and condition (4) is satisfied:

$$-3.0 < f_1/f_w < -1.52 \quad (4)$$

where $f_1$ is a focal length of the first lens group, and $f_w$ is a composite focal length of the first lens group to the fourth lens group at the wide-angle end.

5. A real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and condition (5) is satisfied:

$$2.1 < D_{1w}/f_w < 4.0 \quad (5)$$

where $D_{1w}$ is an axial air separation between the first lens group and the second lens group at the wide-angle end, and $f_w$ is a composite focal length of the first lens group to the fourth lens group at the wide-angle end.

6. A real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and condition (6) is satisfied:

$$6.1 < SD_{w2}/f_w < 10 \quad (6)$$

where $SD_{w2}$ is an axial distance from an object side-surface of the first lens group to an object side-surface of the fifth lens group at the wide-angle end, and $f_w$ is a composite focal length of the first lens group to the fourth lens group at the wide angle end.

7. A real image type finder optical system comprising, in order from an object side thereof, an objective lens group having positive refracting power and an eyepiece lens group having positive refracting power, wherein:

the objective lens group comprises, in order from an object side thereof, a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and condition (7) is satisfied:

$$0.02 < D_{3w}/D_{1w} < [O]0.10 \quad (7)$$

where $D_{3w}$ is an axial air separation between the third lens group and the fourth lens group at the wide-angle end, and $D_{1w}$ is an axial air separation between the first lens group and the second lens group at the wide-angle end.

8. A real image type finder optical system comprising, in order from an object side thereof, an objective lens group having positive refracting power and an eyepiece lens group having positive refracting power, wherein:

the objective lens group comprises, in order from an object side thereof a first lens group consisting of a negative lens element, a second lens group consisting of a positive lens element, a third lens group consisting of a positive lens element and a fourth lens group having negative refracting power and forming a part of an image inverting optical system, wherein upon zooming from a wide-angle end to a telephoto end, the first lens group remains fixed, the second lens group and the third lens group move, and the fourth lens group remains fixed, the eyepiece lens group comprises, in order from an object side thereof, a fifth lens group that forms a part of an image inverting optical system and a sixth lens group having positive refracting power, and condition (8) is satisfied:

$$0.06 < D_{1t}/f_L < 0.80 \quad (8)$$

where $D_{1t}$ is an axial air separation between the first lens group and the second lens group at the telephoto end, and $f_1$ is a composite focal length of the first lens group to the fourth lens group at the telephoto end.

9. An imaging system, comprising a real image type finder optical system as recited in claim 1, and an image-formation optical system that comprises an entrance optical path different from an entrance optical path of the real image type finder optical system and forms an image of a subject observed through the real image type finder optical system.

10. The real image type finder optical system according to claim 1, wherein the fourth lens group has a plurality of reflecting surfaces for allowing three reflections to take place, and the fifth lens group has a roof reflecting surface.

11. The real image type finder optical system according to claim 1, wherein a field stop for limiting a viewing field is located near a focal plane by the objective lens group, and a maximum half angle of view of incidence, $\omega_w$, at the wide-angle end satisfies condition (9).:

$$27° < \omega_w < 45° \quad (9)$$

12. The real image type finder optical system according to claim 1, wherein a field stop for limiting a viewing field is located near a focal plane by the objective lens group, and a maximum half angle of view of incidence, $\omega_t$, at the telephoto end satisfies condition (10).:

$$5° < \omega_t < 18° \quad (10)$$

13. The real image type finder optical system according to claim 1, which further satisfies condition (11):

$$1.7 < f_t/f_w < 6 \quad (11)$$

where $f_t$ is a composite focal length of the first lens group to the fourth lens group at the telephoto end, and $f_w$ is a composite focal length of a composite system of the first lens group to the fourth lens group at the wide-angle end.

14. An imaging system, comprising a real image type finder optical system as recited in any one of claim 2, and an image-formation optical system that comprises an entrance optical path different from an entrance optical path of the real image type finder optical system and forms an image of a subject observed through the real image type finder optical system.

15. An imaging system, comprising a real image type finder optical system as recited in any one of claim 3, and an image-formation optical system that comprises an entrance optical path different from an entrance optical path of the real image type finder optical system and forms an image of a subject observed through the real image type finder optical system.

16. An imaging system, comprising a real image type finder optical system as recited in any one of claim 4, and an image-formation optical system that comprises an entrance optical path different from an entrance optical path of the real image type finder optical system and forms an image of a subject observed through the real image type finder optical system.

17. An imaging system, comprising a real image type finder optical system as recited in any one of claim 5, and an image-formation optical system that comprises an entrance optical path different from an entrance optical path of the real image type finder optical system and forms an image of a subject observed through the real image type finder optical system.

18. An imaging system, comprising a real image type finder optical system as recited in any one of claim 6, and an image-formation optical system that comprises an entrance optical path different from an entrance optical path of the real image type finder optical system and forms an image of a subject observed through the real image type finder optical system.

19. An imaging system, comprising a real image type finder optical system as recited in any one of claim 7, and an image-formation optical system that comprises an entrance optical path different from an entrance optical path of the real image type finder optical system and forms an image of a subject observed through the real image type finder optical system.

20. An imaging system, comprising a real image type finder optical system as recited in any one of claim 8, and an image-formation optical system that comprises an entrance optical path different from an entrance optical path of the real image type finder optical system and forms an image of a subject observed through the real image type finder optical system.

* * * * *